(12) United States Patent
Muhsin et al.

(10) Patent No.: US 12,394,285 B2
(45) Date of Patent: Aug. 19, 2025

(54) LOCALIZED PROJECTION OF AUDIBLE NOISES IN MEDICAL SETTINGS

(71) Applicant: MASIMO CORPORATION, Irvine, CA (US)

(72) Inventors: Bilal Muhsin, San Clemente, CA (US); Ammar Al-Ali, San Juan Capistrano, CA (US)

(73) Assignee: Masimo Corporation, Irvine, CA (US)

( * ) Notice: Subject to any disclaimer, the term of this patent is extended or adjusted under 35 U.S.C. 154(b) by 0 days.

(21) Appl. No.: 18/493,492

(22) Filed: Oct. 24, 2023

(65) Prior Publication Data
US 2024/0135788 A1 Apr. 25, 2024
US 2024/0233496 A9 Jul. 11, 2024

Related U.S. Application Data

(63) Continuation of application No. 17/818,295, filed on Aug. 8, 2022, now Pat. No. 11,830,349, which is a
(Continued)

(51) Int. Cl.
*G08B 3/10* (2006.01)
*G06F 3/16* (2006.01)
(Continued)

(52) U.S. Cl.
CPC ............ *G08B 3/10* (2013.01); *G06F 3/165* (2013.01); *G06F 3/167* (2013.01);
(Continued)

(58) Field of Classification Search
CPC ........... G08B 3/10; G06F 3/165; G06F 3/167; H04R 1/403; H04R 3/00; H04R 3/04;
(Continued)

(56) References Cited

U.S. PATENT DOCUMENTS 4,960,128 A 10/1990 Gordon et al.
4,964,408 A 10/1990 Hink et al.
(Continued)

OTHER PUBLICATIONS

US 2022/0192529 A1, 06/2022, Al-Ali et al. (withdrawn)
US 2024/0016391 A1, 01/2024, Lapotko et al. (withdrawn)

*Primary Examiner* — Sonia L Gay
(74) *Attorney, Agent, or Firm* — Knobbe, Martens, Olson & Bear, LLP

(57) ABSTRACT

A localized sound projection system can coordinate the sounds of speakers to simulate the placement of an auditory cue in a 3D space. The system can include a plurality of speakers configured to output auditory signals and a sound localization controller configured to control the plurality of speakers to coordinate the auditory signals to simulate an origination location of a patient alarm. The sound localization controller can determine adjusted auditory signals and control a plurality of speakers to output the plurality of adjusted auditory signals. A method for dynamically controlling speaker settings in a medical environment can include determining volume settings corresponding to a speaker, monitoring a level of ambient noise corresponding to a room of a patient, controlling the volume settings of the speaker to reduce or increase a sound level output of a speaker. A patient monitoring system can be configured to physically manipulate medical devices in response to audible commands. The system can receive a plurality of vocal commands from a user and can manipulate various settings after confirmation from a user.

12 Claims, 13 Drawing Sheets

Related U.S. Application Data continuation of application No. 16/533,248, filed on Aug. 6, 2019, now Pat. No. 11,410,507, which is a continuation of application No. 15/905,332, filed on Feb. 26, 2018, now Pat. No. 10,388,120.

(60) Provisional application No. 62/463,490, filed on Feb. 24, 2017.

(51) Int. Cl.
    *G08B 21/04* (2006.01)
    *H04R 1/40* (2006.01)
    *H04R 3/00* (2006.01)
    *H04R 3/04* (2006.01)
    *H04R 3/12* (2006.01)
    *H04R 27/00* (2006.01)
    *H04R 29/00* (2006.01)

(52) U.S. Cl.
    CPC ......... *G08B 21/0453* (2013.01); *H04R 1/403* (2013.01); *H04R 3/00* (2013.01); *H04R 3/04* (2013.01); *H04R 3/12* (2013.01); *H04R 29/002* (2013.01); *H04R 27/00* (2013.01); *H04R 2430/00* (2013.01); *H04R 2430/01* (2013.01)

(58) Field of Classification Search
    CPC ........ H04R 3/12; H04R 29/002; H04R 27/00; H04R 2430/00
    See application file for complete search history.

(56) References Cited

U.S. PATENT DOCUMENTS

| | | |
|---|---|---|
| 5,041,187 A | 8/1991 | Hink et al. |
| 5,069,213 A | 12/1991 | Hink et al. |
| 5,163,438 A | 11/1992 | Gordon et al. |
| 5,319,355 A | 6/1994 | Russek |
| 5,337,744 A | 8/1994 | Branigan |
| 5,341,805 A | 8/1994 | Stavridi et al. |
| 5,377,676 A | 1/1995 | Vari et al. |
| 5,431,170 A | 7/1995 | Mathews |
| 5,436,499 A | 7/1995 | Namavar et al. |
| 5,452,717 A | 9/1995 | Branigan et al. |
| 5,456,252 A | 10/1995 | Vari et al. |
| 5,479,934 A | 1/1996 | Imran |
| 5,482,036 A | 1/1996 | Diab et al. |
| 5,490,505 A | 2/1996 | Diab et al. |
| 5,494,043 A | 2/1996 | O'Sullivan et al. |
| 5,533,511 A | 7/1996 | Kaspari et al. |
| 5,534,851 A | 7/1996 | Russek |
| 5,590,649 A | 1/1997 | Caro et al. |
| 5,602,924 A | 2/1997 | Durand et al. |
| 5,632,272 A | 5/1997 | Diab et al. |
| 5,638,816 A | 6/1997 | Kiani-Azarbayjany et al. |
| 5,638,818 A | 6/1997 | Diab et al. |
| 5,645,440 A | 7/1997 | Tobler et al. |
| 5,671,914 A | 9/1997 | Kalkhoran et al. |
| 5,685,299 A | 11/1997 | Diab et al. |
| 5,726,440 A | 3/1998 | Kalkhoran et al. |
| D393,830 S | 4/1998 | Tobler et al. |
| 5,743,262 A | 4/1998 | Lepper, Jr. et al. |
| 5,747,806 A | 5/1998 | Khalil et al. |
| 5,750,994 A | 5/1998 | Schlager |
| 5,758,644 A | 6/1998 | Diab et al. |
| 5,760,910 A | 6/1998 | Lepper, Jr. et al. |
| 5,769,785 A | 6/1998 | Diab et al. |
| 5,782,757 A | 7/1998 | Diab et al. |
| 5,785,659 A | 7/1998 | Caro et al. |
| 5,791,347 A | 8/1998 | Flaherty et al. |
| 5,810,734 A | 9/1998 | Caro et al. |
| 5,823,950 A | 10/1998 | Diab et al. |
| 5,830,131 A | 11/1998 | Caro et al. |
| 5,833,618 A | 11/1998 | Caro et al. |
| 5,860,919 A | 1/1999 | Kiani-Azarbayjany et al. |
| 5,890,929 A | 4/1999 | Mills et al. |
| 5,904,654 A | 5/1999 | Wohltmann et al. |
| 5,919,134 A | 7/1999 | Diab |
| 5,934,925 A | 8/1999 | Tobler et al. |
| 5,940,182 A | 8/1999 | Lepper, Jr. et al. |
| 5,987,343 A | 11/1999 | Kinast |
| 5,995,855 A | 11/1999 | Kiani et al. |
| 5,997,343 A | 12/1999 | Mills et al. |
| 6,002,952 A | 12/1999 | Diab et al. |
| 6,010,937 A | 1/2000 | Karam et al. |
| 6,011,986 A | 1/2000 | Diab et al. |
| 6,027,452 A | 2/2000 | Flaherty et al. |
| 6,036,642 A | 3/2000 | Diab et al. |
| 6,040,578 A | 3/2000 | Malin et al. |
| 6,045,509 A | 4/2000 | Caro et al. |
| 6,066,204 A | 5/2000 | Haven |
| 6,067,462 A | 5/2000 | Diab et al. |
| 6,081,735 A | 6/2000 | Diab et al. |
| 6,084,516 A * | 7/2000 | Yasushi ............... A61B 5/0002 340/8.1 |
| 6,088,607 A | 7/2000 | Diab et al. |
| 6,110,522 A | 8/2000 | Lepper, Jr. et al. |
| 6,115,673 A | 9/2000 | Malin et al. |
| 6,124,597 A | 9/2000 | Shehada et al. |
| 6,128,521 A | 10/2000 | Marro et al. |
| 6,129,675 A | 10/2000 | Jay |
| 6,144,868 A | 11/2000 | Parker |
| 6,151,516 A | 11/2000 | Kiani-Azarbayjany et al. |
| 6,152,754 A | 11/2000 | Gerhardt et al. |
| 6,157,850 A | 12/2000 | Diab et al. |
| 6,165,005 A | 12/2000 | Mills et al. |
| 6,184,521 B1 | 2/2001 | Coffin, IV et al. |
| 6,206,830 B1 | 3/2001 | Diab et al. |
| 6,229,856 B1 | 5/2001 | Diab et al. |
| 6,232,609 B1 | 5/2001 | Snyder et al. |
| 6,236,872 B1 | 5/2001 | Diab et al. |
| 6,241,683 B1 | 6/2001 | Macklem et al. |
| 6,253,097 B1 | 6/2001 | Aronow et al. |
| 6,255,708 B1 | 7/2001 | Sudharsanan et al. |
| 6,256,523 B1 | 7/2001 | Diab et al. |
| 6,263,222 B1 | 7/2001 | Diab et al. |
| 6,278,522 B1 | 8/2001 | Lepper, Jr. et al. |
| 6,280,213 B1 | 8/2001 | Tobler et al. |
| 6,280,381 B1 | 8/2001 | Malin et al. |
| 6,285,896 B1 | 9/2001 | Tobler et al. |
| 6,301,493 B1 | 10/2001 | Marro et al. |
| 6,308,089 B1 | 10/2001 | von der Ruhr et al. |
| 6,317,627 B1 | 11/2001 | Ennen et al. |
| 6,321,100 B1 | 11/2001 | Parker |
| 6,325,761 B1 | 12/2001 | Jay |
| 6,334,065 B1 | 12/2001 | Al-Ali et al. |
| 6,343,224 B1 | 1/2002 | Parker |
| 6,349,228 B1 | 2/2002 | Kiani et al. |
| 6,360,114 B1 | 3/2002 | Diab et al. |
| 6,368,283 B1 | 4/2002 | Xu et al. |
| 6,371,921 B1 | 4/2002 | Caro et al. |
| 6,377,829 B1 | 4/2002 | Al-Ali |
| 6,388,240 B2 | 5/2002 | Schulz et al. |
| 6,397,091 B2 | 5/2002 | Diab et al. |
| 6,411,373 B1 | 6/2002 | Garside et al. |
| 6,415,167 B1 | 7/2002 | Blank et al. |
| 6,430,437 B1 | 8/2002 | Marro |
| 6,430,525 B1 | 8/2002 | Weber et al. |
| 6,463,311 B1 | 10/2002 | Diab |
| 6,470,199 B1 | 10/2002 | Kopotic et al. |
| 6,487,429 B2 | 11/2002 | Hockersmith et al. |
| 6,501,975 B2 | 12/2002 | Diab et al. |
| 6,505,059 B1 | 1/2003 | Kollias et al. |
| 6,515,273 B2 | 2/2003 | Al-Ali |
| 6,519,487 B1 | 2/2003 | Parker |
| 6,525,386 B1 | 2/2003 | Mills et al. |
| 6,526,300 B1 | 2/2003 | Kiani et al. |
| 6,534,012 B1 | 3/2003 | Hazen et al. |
| 6,541,756 B2 | 4/2003 | Schulz et al. |
| 6,542,764 B1 | 4/2003 | Al-Ali et al. |
| 6,580,086 B1 | 6/2003 | Schulz et al. |
| 6,584,336 B1 | 6/2003 | Ali et al. |
| 6,587,196 B1 | 7/2003 | Stippick et al. |

(56) References Cited

U.S. PATENT DOCUMENTS

| | | |
|---|---|---|
| 6,587,199 B1 | 7/2003 | Luu |
| 6,597,932 B2 | 7/2003 | Tian et al. |
| 6,597,933 B2 | 7/2003 | Kiani et al. |
| 6,606,511 B1 | 8/2003 | Ali et al. |
| 6,632,181 B2 | 10/2003 | Flaherty et al. |
| 6,635,559 B2 | 10/2003 | Greenwald et al. |
| 6,639,668 B1 | 10/2003 | Trepagnier |
| 6,640,116 B2 | 10/2003 | Diab |
| 6,640,117 B2 | 10/2003 | Makarewicz et al. |
| 6,643,530 B2 | 11/2003 | Diab et al. |
| 6,650,917 B2 | 11/2003 | Diab et al. |
| 6,654,624 B2 | 11/2003 | Diab et al. |
| 6,658,276 B2 | 12/2003 | Kiani et al. |
| 6,661,161 B1 | 12/2003 | Lanzo et al. |
| 6,671,531 B2 | 12/2003 | Al-Ali |
| 6,678,543 B2 | 1/2004 | Diab et al. |
| 6,684,090 B2 | 1/2004 | Ali et al. |
| 6,684,091 B2 | 1/2004 | Parker |
| 6,697,656 B1 | 2/2004 | Al-Ali |
| 6,697,657 B1 | 2/2004 | Shehada et al. |
| 6,697,658 B2 | 2/2004 | Al-Ali |
| RE38,476 E | 3/2004 | Diab et al. |
| 6,699,194 B1 | 3/2004 | Diab et al. |
| 6,714,804 B2 | 3/2004 | Al-Ali et al. |
| RE38,492 E | 4/2004 | Diab et al. |
| 6,721,582 B2 | 4/2004 | Trepagnier et al. |
| 6,721,585 B1 | 4/2004 | Parker |
| 6,725,075 B2 | 4/2004 | Al-Ali |
| 6,728,560 B2 | 4/2004 | Kollias et al. |
| 6,735,459 B2 | 5/2004 | Parker |
| 6,738,652 B2 | 5/2004 | Mattu et al. |
| 6,745,060 B2 | 6/2004 | Diab et al. |
| 6,760,607 B2 | 7/2004 | Al-Ali |
| 6,770,028 B1 | 8/2004 | Ali et al. |
| 6,771,994 B2 | 8/2004 | Kiani et al. |
| 6,788,965 B2 | 9/2004 | Ruchti et al. |
| 6,792,300 B1 | 9/2004 | Diab et al. |
| 6,813,511 B2 | 11/2004 | Diab et al. |
| 6,816,241 B2 | 11/2004 | Grubisic |
| 6,816,741 B2 | 11/2004 | Diab |
| 6,822,564 B2 | 11/2004 | Al-Ali |
| 6,826,419 B2 | 11/2004 | Diab et al. |
| 6,830,711 B2 | 12/2004 | Mills et al. |
| 6,850,787 B2 | 2/2005 | Weber et al. |
| 6,850,788 B2 | 2/2005 | Al-Ali |
| 6,852,083 B2 | 2/2005 | Caro et al. |
| 6,861,639 B2 | 3/2005 | Al-Ali |
| 6,876,931 B2 | 4/2005 | Lorenz et al. |
| 6,898,452 B2 | 5/2005 | Al-Ali et al. |
| 6,920,345 B2 | 7/2005 | Al-Ali et al. |
| 6,931,268 B1 | 8/2005 | Kiani-Azarbayjany et al. |
| 6,934,570 B2 | 8/2005 | Kiani et al. |
| 6,939,305 B2 | 9/2005 | Flaherty et al. |
| 6,943,348 B1 | 9/2005 | Coffin IV |
| 6,950,687 B2 | 9/2005 | Al-Ali |
| 6,956,649 B2 | 10/2005 | Acosta et al. |
| 6,961,598 B2 | 11/2005 | Diab |
| 6,970,792 B1 | 11/2005 | Diab |
| 6,979,812 B2 | 12/2005 | Al-Ali |
| 6,985,764 B2 | 1/2006 | Mason et al. |
| 6,990,364 B2 | 1/2006 | Ruchti et al. |
| 6,993,371 B2 | 1/2006 | Kiani et al. |
| 6,996,427 B2 | 2/2006 | Ali et al. |
| 6,998,247 B2 | 2/2006 | Monfre et al. |
| 6,999,904 B2 | 2/2006 | Weber et al. |
| 7,003,338 B2 | 2/2006 | Weber et al. |
| 7,003,339 B2 | 2/2006 | Diab et al. |
| 7,015,451 B2 | 3/2006 | Dalke et al. |
| 7,024,233 B2 | 4/2006 | Ali et al. |
| 7,027,849 B2 | 4/2006 | Ai-Ali |
| 7,030,749 B2 | 4/2006 | Ai-Ali |
| 7,039,449 B2 | 5/2006 | Al-Ali |
| 7,041,060 B2 | 5/2006 | Flaherty et al. |
| 7,044,918 B2 | 5/2006 | Diab |
| 7,048,687 B1 | 5/2006 | Reuss et al. |
| 7,067,893 B2 | 6/2006 | Mills et al. |
| D526,719 S | 8/2006 | Richie, Jr. et al. |
| 7,096,052 B2 | 8/2006 | Mason et al. |
| 7,096,054 B2 | 8/2006 | Abdul-Hafiz et al. |
| D529,616 S | 10/2006 | Deros et al. |
| 7,132,641 B2 | 11/2006 | Schulz et al. |
| 7,133,710 B2 | 11/2006 | Acosta et al. |
| 7,142,901 B2 | 11/2006 | Kiani et al. |
| 7,149,561 B2 | 12/2006 | Diab |
| 7,186,966 B2 | 3/2007 | Al-Ali |
| 7,190,261 B2 | 3/2007 | Al-Ali |
| 7,215,984 B2 | 5/2007 | Diab et al. |
| 7,215,986 B2 | 5/2007 | Diab et al. |
| 7,221,971 B2 | 5/2007 | Diab et al. |
| 7,225,006 B2 | 5/2007 | Al-Ali et al. |
| 7,225,007 B2 | 5/2007 | Al-Ali et al. |
| RE39,672 E | 6/2007 | Shehada et al. |
| 7,239,905 B2 | 7/2007 | Kiani-Azarbayjany et al. |
| 7,245,953 B1 | 7/2007 | Parker |
| 7,254,429 B2 | 8/2007 | Schurman et al. |
| 7,254,431 B2 | 8/2007 | Al-Ali et al. |
| 7,254,433 B2 | 8/2007 | Diab et al. |
| 7,254,434 B2 | 8/2007 | Schulz et al. |
| 7,272,425 B2 | 9/2007 | Al-Ali |
| 7,274,955 B2 | 9/2007 | Kiani et al. |
| D554,263 S | 10/2007 | Al-Ali et al. |
| 7,280,858 B2 | 10/2007 | Al-Ali et al. |
| 7,289,835 B2 | 10/2007 | Mansfield et al. |
| 7,292,883 B2 | 11/2007 | De Felice et al. |
| 7,295,866 B2 | 11/2007 | Al-Ali |
| 7,327,219 B2 | 2/2008 | Lederer, IV |
| 7,328,053 B1 | 2/2008 | Diab et al. |
| 7,332,784 B2 | 2/2008 | Mills et al. |
| 7,340,287 B2 | 3/2008 | Mason et al. |
| 7,341,559 B2 | 3/2008 | Schulz et al. |
| 7,343,186 B2 | 3/2008 | Lamego et al. |
| D566,282 S | 4/2008 | Al-Ali et al. |
| 7,355,512 B1 | 4/2008 | Al-Ali |
| 7,356,365 B2 | 4/2008 | Schurman |
| 7,371,981 B2 | 5/2008 | Abdul-Hafiz |
| 7,373,193 B2 | 5/2008 | Al-Ali et al. |
| 7,373,194 B2 | 5/2008 | Weber et al. |
| 7,376,453 B1 | 5/2008 | Diab et al. |
| 7,377,794 B2 | 5/2008 | Al-Ali et al. |
| 7,377,899 B2 | 5/2008 | Weber et al. |
| 7,383,070 B2 | 6/2008 | Diab et al. |
| 7,395,158 B2 | 7/2008 | Monfre et al. |
| 7,415,297 B2 | 8/2008 | Al-Ali et al. |
| 7,428,432 B2 | 9/2008 | Ali et al. |
| 7,438,683 B2 | 10/2008 | Al-Ali et al. |
| 7,440,787 B2 | 10/2008 | Diab |
| 7,454,240 B2 | 11/2008 | Diab et al. |
| 7,467,002 B2 | 12/2008 | Weber et al. |
| 7,469,157 B2 | 12/2008 | Diab et al. |
| 7,471,969 B2 | 12/2008 | Diab et al. |
| 7,471,971 B2 | 12/2008 | Diab et al. |
| 7,483,729 B2 | 1/2009 | Al-Ali et al. |
| 7,483,730 B2 | 1/2009 | Diab et al. |
| 7,489,958 B2 | 2/2009 | Diab et al. |
| 7,496,391 B2 | 2/2009 | Diab et al. |
| 7,496,393 B2 | 2/2009 | Diab et al. |
| D587,657 S | 3/2009 | Al-Ali et al. |
| 7,499,741 B2 | 3/2009 | Diab et al. |
| 7,499,835 B2 | 3/2009 | Weber et al. |
| 7,500,950 B2 | 3/2009 | Al-Ali et al. |
| 7,509,154 B2 | 3/2009 | Diab et al. |
| 7,509,494 B2 | 3/2009 | Al-Ali |
| 7,510,849 B2 | 3/2009 | Schurman et al. |
| 7,514,725 B2 | 4/2009 | Wojtczuk et al. |
| 7,519,406 B2 | 4/2009 | Blank et al. |
| 7,526,328 B2 | 4/2009 | Diab et al. |
| D592,507 S | 5/2009 | Wachman et al. |
| 7,530,942 B1 | 5/2009 | Diab |
| 7,530,949 B2 | 5/2009 | Al Ali et al. |
| 7,530,955 B2 | 5/2009 | Diab et al. |
| 7,563,110 B2 | 7/2009 | Al-Ali et al. |
| 7,593,230 B2 | 9/2009 | Abul-Haj et al. |
| 7,596,398 B2 | 9/2009 | Al-Ali et al. |
| 7,606,608 B2 | 10/2009 | Blank et al. |

(56) References Cited

U.S. PATENT DOCUMENTS

| | | |
|---|---|---|
| 7,618,375 B2 | 11/2009 | Flaherty et al. |
| 7,620,674 B2 | 11/2009 | Ruchti et al. |
| D606,659 S | 12/2009 | Kiani et al. |
| 7,629,039 B2 | 12/2009 | Eckerbom et al. |
| 7,640,140 B2 | 12/2009 | Ruchti et al. |
| 7,647,083 B2 | 1/2010 | Al-Ali et al. |
| D609,193 S | 2/2010 | Al-Ali et al. |
| D614,305 S | 4/2010 | Al-Ali et al. |
| 7,697,966 B2 | 4/2010 | Monfre et al. |
| 7,698,105 B2 | 4/2010 | Ruchti et al. |
| RE41,317 E | 5/2010 | Parker |
| RE41,333 E | 5/2010 | Blank et al. |
| 7,729,733 B2 | 6/2010 | Al-Ali et al. |
| 7,734,320 B2 | 6/2010 | Al-Ali |
| 7,761,127 B2 | 7/2010 | Al-Ali et al. |
| 7,761,128 B2 | 7/2010 | Al-Ali et al. |
| 7,764,982 B2 | 7/2010 | Dalke et al. |
| D621,516 S | 8/2010 | Kiani et al. |
| 7,791,155 B2 | 9/2010 | Diab |
| 7,801,581 B2 | 9/2010 | Diab |
| 7,822,452 B2 | 10/2010 | Schurman et al. |
| RE41,912 E | 11/2010 | Parker |
| 7,844,313 B2 | 11/2010 | Kiani et al. |
| 7,844,314 B2 | 11/2010 | Al-Ali |
| 7,844,315 B2 | 11/2010 | Al-Ali |
| 7,865,222 B2 | 1/2011 | Weber et al. |
| 7,873,497 B2 | 1/2011 | Weber et al. |
| 7,880,606 B2 | 2/2011 | Al-Ali |
| 7,880,626 B2 | 2/2011 | Al-Ali et al. |
| 7,891,355 B2 | 2/2011 | Al-Ali et al. |
| 7,894,868 B2 | 2/2011 | Al-Ali et al. |
| 7,899,507 B2 | 3/2011 | Al-Ali et al. |
| 7,904,132 B2 | 3/2011 | Weber et al. |
| 7,909,772 B2 | 3/2011 | Popov et al. |
| 7,910,875 B2 | 3/2011 | Al-Ali |
| 7,919,713 B2 | 4/2011 | Al-Ali et al. |
| 7,937,128 B2 | 5/2011 | Al-Ali |
| 7,937,129 B2 | 5/2011 | Mason et al. |
| 7,937,130 B2 | 5/2011 | Diab et al. |
| 7,941,199 B2 | 5/2011 | Kiani |
| 7,951,086 B2 | 5/2011 | Flaherty et al. |
| 7,957,780 B2 | 6/2011 | Lamego et al. |
| 7,962,188 B2 | 6/2011 | Kiani et al. |
| 7,962,190 B1 | 6/2011 | Diab et al. |
| 7,976,472 B2 | 7/2011 | Kiani |
| 7,988,637 B2 | 8/2011 | Diab |
| 7,990,382 B2 | 8/2011 | Kiani |
| 7,991,446 B2 | 8/2011 | Ali et al. |
| 8,000,761 B2 | 8/2011 | Al-Ali |
| 8,008,088 B2 | 8/2011 | Bellott et al. |
| RE42,753 E | 9/2011 | Kiani-Azarbayjany et al. |
| 8,019,400 B2 | 9/2011 | Diab et al. |
| 8,028,701 B2 | 10/2011 | Al-Ali et al. |
| 8,029,765 B2 | 10/2011 | Bellott et al. |
| 8,036,727 B2 | 10/2011 | Schurman et al. |
| 8,036,728 B2 | 10/2011 | Diab et al. |
| 8,046,040 B2 | 10/2011 | Ali et al. |
| 8,046,041 B2 | 10/2011 | Diab et al. |
| 8,046,042 B2 | 10/2011 | Diab et al. |
| 8,048,040 B2 | 11/2011 | Kiani |
| 8,050,728 B2 | 11/2011 | Al-Ali et al. |
| RE43,169 E | 2/2012 | Parker |
| 8,118,620 B2 | 2/2012 | Al-Ali et al. |
| 8,126,528 B2 | 2/2012 | Diab et al. |
| 8,128,572 B2 | 3/2012 | Diab et al. |
| 8,130,105 B2 | 3/2012 | Al-Ali et al. |
| 8,145,287 B2 | 3/2012 | Diab et al. |
| 8,150,487 B2 | 4/2012 | Diab et al. |
| 8,175,672 B2 | 5/2012 | Parker |
| 8,180,420 B2 | 5/2012 | Diab et al. |
| 8,182,443 B1 | 5/2012 | Kiani |
| 8,185,180 B2 | 5/2012 | Diab et al. |
| 8,190,223 B2 | 5/2012 | Al-Ali et al. |
| 8,190,227 B2 | 5/2012 | Diab et al. |
| 8,203,438 B2 | 6/2012 | Kiani et al. |
| 8,203,704 B2 | 6/2012 | Merritt et al. |
| 8,204,566 B2 | 6/2012 | Schurman et al. |
| 8,219,172 B2 | 7/2012 | Schurman et al. |
| 8,224,411 B2 | 7/2012 | Al-Ali et al. |
| 8,228,181 B2 | 7/2012 | Al-Ali |
| 8,229,532 B2 | 7/2012 | Davis |
| 8,229,533 B2 | 7/2012 | Diab et al. |
| 8,233,955 B2 | 7/2012 | Al-Ali et al. |
| 8,244,325 B2 | 8/2012 | Al-Ali et al. |
| 8,255,026 B1 | 8/2012 | Al-Ali |
| 8,255,027 B2 | 8/2012 | Al-Ali et al. |
| 8,255,028 B2 | 8/2012 | Al-Ali et al. |
| 8,260,577 B2 | 9/2012 | Weber et al. |
| 8,265,723 B1 | 9/2012 | McHale et al. |
| 8,274,360 B2 | 9/2012 | Sampath et al. |
| 8,280,473 B2 | 10/2012 | Al-Ali |
| 8,301,217 B2 | 10/2012 | Al-Ali et al. |
| 8,306,596 B2 | 11/2012 | Schurman et al. |
| 8,310,336 B2 | 11/2012 | Muhsin et al. |
| 8,315,683 B2 | 11/2012 | Al-Ali et al. |
| RE43,860 E | 12/2012 | Parker |
| 8,337,403 B2 | 12/2012 | Al-Ali et al. |
| 8,346,330 B2 | 1/2013 | Lamego |
| 8,353,842 B2 | 1/2013 | Al-Ali et al. |
| 8,355,766 B2 | 1/2013 | MacNeish, III et al. |
| 8,359,080 B2 | 1/2013 | Diab et al. |
| 8,364,223 B2 | 1/2013 | Al-Ali et al. |
| 8,364,226 B2 | 1/2013 | Diab et al. |
| 8,374,665 B2 | 2/2013 | Lamego |
| 8,385,995 B2 | 2/2013 | Al-Ali et al. |
| 8,385,996 B2 | 2/2013 | Smith et al. |
| 8,388,353 B2 | 3/2013 | Kiani et al. |
| 8,399,822 B2 | 3/2013 | Al-Ali |
| 8,401,602 B2 | 3/2013 | Kiani |
| 8,405,608 B2 | 3/2013 | Al-Ali et al. |
| 8,414,499 B2 | 4/2013 | Al-Ali et al. |
| 8,418,524 B2 | 4/2013 | Al-Ali |
| 8,423,106 B2 | 4/2013 | Lamego et al. |
| 8,428,967 B2 | 4/2013 | Olsen et al. |
| 8,430,817 B1 | 4/2013 | Al-Ali et al. |
| 8,437,825 B2 | 5/2013 | Dalvi et al. |
| 8,455,290 B2 | 6/2013 | Siskavich |
| 8,457,703 B2 | 6/2013 | Al-Ali |
| 8,457,707 B2 | 6/2013 | Kiani |
| 8,463,349 B2 | 6/2013 | Diab et al. |
| 8,466,286 B2 | 6/2013 | Bellott et al. |
| 8,471,713 B2 | 6/2013 | Poeze et al. |
| 8,473,020 B2 | 6/2013 | Kiani et al. |
| 8,483,787 B2 | 7/2013 | Al-Ali et al. |
| 8,489,364 B2 | 7/2013 | Weber et al. |
| 8,495,515 B2 | 7/2013 | Bush et al. |
| 8,498,684 B2 | 7/2013 | Weber et al. |
| 8,504,128 B2 | 8/2013 | Blank et al. |
| 8,509,867 B2 | 8/2013 | Workman et al. |
| 8,515,509 B2 | 8/2013 | Bruinsma et al. |
| 8,523,781 B2 | 9/2013 | Al-Ali |
| 8,529,301 B2 | 9/2013 | Al-Ali et al. |
| 8,532,727 B2 | 9/2013 | Ali et al. |
| 8,532,728 B2 | 9/2013 | Diab et al. |
| D692,145 S | 10/2013 | Al-Ali et al. |
| 8,547,209 B2 | 10/2013 | Kiani et al. |
| 8,548,548 B2 | 10/2013 | Al-Ali |
| 8,548,549 B2 | 10/2013 | Schurman et al. |
| 8,548,550 B2 | 10/2013 | Al-Ali et al. |
| 8,560,032 B2 | 10/2013 | Al-Ali et al. |
| 8,560,034 B1 | 10/2013 | Diab et al. |
| 8,570,167 B2 | 10/2013 | Al-Ali |
| 8,570,503 B2 | 10/2013 | Vo et al. |
| 8,571,617 B2 | 10/2013 | Reichgott et al. |
| 8,571,618 B1 | 10/2013 | Lamego et al. |
| 8,571,619 B2 | 10/2013 | Al-Ali et al. |
| 8,577,431 B2 | 11/2013 | Lamego et al. |
| 8,581,732 B2 | 11/2013 | Al-Ali et al. |
| 8,584,345 B2 | 11/2013 | Al-Ali et al. |
| 8,588,880 B2 | 11/2013 | Abdul-Hafiz et al. |
| 8,600,467 B2 | 12/2013 | Al-Ali et al. |
| 8,606,342 B2 | 12/2013 | Diab |
| 8,626,255 B2 | 1/2014 | Al-Ali et al. |
| 8,630,691 B2 | 1/2014 | Lamego et al. |

(56) References Cited

U.S. PATENT DOCUMENTS

| | | |
|---|---|---|
| 8,634,889 B2 | 1/2014 | Al-Ali et al. |
| 8,641,631 B2 | 2/2014 | Sierra et al. |
| 8,652,060 B2 | 2/2014 | Al-Ali |
| 8,663,107 B2 | 3/2014 | Kiani |
| 8,666,468 B1 | 3/2014 | Al-Ali |
| 8,667,967 B2 | 3/2014 | Al-Ali et al. |
| 8,670,811 B2 | 3/2014 | O'Reilly |
| 8,670,814 B2 | 3/2014 | Diab et al. |
| 8,676,286 B2 | 3/2014 | Weber et al. |
| 8,682,407 B2 | 3/2014 | Al-Ali |
| RE44,823 E | 4/2014 | Parker |
| RE44,875 E | 4/2014 | Kiani et al. |
| 8,688,183 B2 | 4/2014 | Bruinsma et al. |
| 8,690,799 B2 | 4/2014 | Telfort et al. |
| 8,700,112 B2 | 4/2014 | Kiani |
| 8,702,627 B2 | 4/2014 | Telfort et al. |
| 8,706,179 B2 | 4/2014 | Parker |
| 8,712,494 B1 | 4/2014 | MacNeish, III et al. |
| 8,715,206 B2 | 5/2014 | Telfort et al. |
| 8,718,735 B2 | 5/2014 | Lamego et al. |
| 8,718,737 B2 | 5/2014 | Diab et al. |
| 8,718,738 B2 | 5/2014 | Blank et al. |
| 8,720,249 B2 | 5/2014 | Al-Ali |
| 8,721,541 B2 | 5/2014 | Al-Ali et al. |
| 8,721,542 B2 | 5/2014 | Al-Ali et al. |
| 8,723,677 B1 | 5/2014 | Kiani |
| 8,740,792 B1 | 6/2014 | Kiani et al. |
| 8,754,776 B2 | 6/2014 | Poeze et al. |
| 8,755,535 B2 | 6/2014 | Telfort et al. |
| 8,755,856 B2 | 6/2014 | Diab et al. |
| 8,755,872 B1 | 6/2014 | Marinow |
| 8,761,850 B2 | 6/2014 | Lamego |
| 8,764,671 B2 | 7/2014 | Kiani |
| 8,768,423 B2 | 7/2014 | Shakespeare et al. |
| 8,771,204 B2 | 7/2014 | Telfort et al. |
| 8,777,634 B2 | 7/2014 | Kiani et al. |
| 8,781,543 B2 | 7/2014 | Diab et al. |
| 8,781,544 B2 | 7/2014 | Al-Ali et al. |
| 8,781,549 B2 | 7/2014 | Al-Ali et al. |
| 8,788,003 B2 | 7/2014 | Schurman et al. |
| 8,790,268 B2 | 7/2014 | Al-Ali |
| 8,801,613 B2 | 8/2014 | Al-Ali et al. |
| 8,821,397 B2 | 9/2014 | Al-Ali et al. |
| 8,821,415 B2 | 9/2014 | Al-Ali et al. |
| 8,830,449 B1 | 9/2014 | Lamego et al. |
| 8,831,700 B2 | 9/2014 | Schurman et al. |
| 8,840,549 B2 | 9/2014 | Al-Ali et al. |
| 8,847,740 B2 | 9/2014 | Kiani et al. |
| 8,849,365 B2 | 9/2014 | Smith et al. |
| 8,852,094 B2 | 10/2014 | Al-Ali et al. |
| 8,852,994 B2 | 10/2014 | Wojtczuk et al. |
| 8,868,147 B2 | 10/2014 | Stippick et al. |
| 8,868,150 B2 | 10/2014 | Al-Ali et al. |
| 8,870,792 B2 | 10/2014 | Al-Ali et al. |
| 8,886,271 B2 | 11/2014 | Kiani et al. |
| 8,888,539 B2 | 11/2014 | Al-Ali et al. |
| 8,888,708 B2 | 11/2014 | Diab et al. |
| 8,892,180 B2 | 11/2014 | Weber et al. |
| 8,897,847 B2 | 11/2014 | Al-Ali |
| 8,909,310 B2 | 12/2014 | Lamego et al. |
| 8,911,377 B2 | 12/2014 | Al-Ali |
| 8,912,909 B2 | 12/2014 | Al-Ali et al. |
| 8,920,317 B2 | 12/2014 | Al-Ali et al. |
| 8,921,699 B2 | 12/2014 | Al-Ali et al. |
| 8,922,382 B2 | 12/2014 | Al-Ali et al. |
| 8,929,964 B2 | 1/2015 | Al-Ali et al. |
| 8,942,777 B2 | 1/2015 | Diab et al. |
| 8,948,834 B2 | 2/2015 | Diab et al. |
| 8,948,835 B2 | 2/2015 | Diab |
| 8,965,471 B2 | 2/2015 | Lamego |
| 8,983,564 B2 | 3/2015 | Al-Ali |
| 8,989,831 B2 | 3/2015 | Al-Ali et al. |
| 8,996,085 B2 | 3/2015 | Kiani et al. |
| 8,998,809 B2 | 4/2015 | Kiani |
| 9,028,429 B2 | 5/2015 | Telfort et al. |
| 9,037,207 B2 | 5/2015 | Al-Ali et al. |
| 9,060,721 B2 | 6/2015 | Reichgott et al. |
| 9,066,666 B2 | 6/2015 | Kiani |
| 9,066,680 B1 | 6/2015 | Al-Ali et al. |
| 9,072,474 B2 | 7/2015 | Al-Ali et al. |
| 9,078,560 B2 | 7/2015 | Schurman et al. |
| 9,084,569 B2 | 7/2015 | Weber et al. |
| 9,095,316 B2 | 8/2015 | Welch et al. |
| 9,106,038 B2 | 8/2015 | Telfort et al. |
| 9,107,625 B2 | 8/2015 | Telfort et al. |
| 9,107,626 B2 | 8/2015 | Al-Ali et al. |
| 9,113,831 B2 | 8/2015 | Al-Ali |
| 9,113,832 B2 | 8/2015 | Al-Ali |
| 9,119,595 B2 | 9/2015 | Lamego |
| 9,131,881 B2 | 9/2015 | Diab et al. |
| 9,131,882 B2 | 9/2015 | Al-Ali et al. |
| 9,131,883 B2 | 9/2015 | Al-Ali |
| 9,131,917 B2 | 9/2015 | Telfort et al. |
| 9,138,180 B1 | 9/2015 | Coverston et al. |
| 9,138,182 B2 | 9/2015 | Al-Ali et al. |
| 9,138,192 B2 | 9/2015 | Weber et al. |
| 9,142,117 B2 | 9/2015 | Muhsin et al. |
| 9,153,112 B1 | 10/2015 | Kiani et al. |
| 9,153,121 B2 | 10/2015 | Kiani et al. |
| 9,161,696 B2 | 10/2015 | Al-Ali et al. |
| 9,161,713 B2 | 10/2015 | Al-Ali et al. |
| 9,167,995 B2 | 10/2015 | Lamego et al. |
| 9,176,141 B2 | 11/2015 | Al-Ali et al. |
| 9,186,102 B2 | 11/2015 | Bruinsma et al. |
| 9,192,312 B2 | 11/2015 | Al-Ali |
| 9,192,329 B2 | 11/2015 | Al-Ali |
| 9,192,351 B1 | 11/2015 | Telfort et al. |
| 9,195,385 B2 | 11/2015 | Al-Ali et al. |
| 9,211,072 B2 | 12/2015 | Kiani |
| 9,211,095 B1 | 12/2015 | Al-Ali |
| 9,218,454 B2 | 12/2015 | Kiani et al. |
| 9,226,696 B2 | 1/2016 | Kiani |
| 9,241,662 B2 | 1/2016 | Al-Ali et al. |
| 9,245,668 B1 | 1/2016 | Vo et al. |
| 9,259,185 B2 | 2/2016 | Abdul-Hafiz et al. |
| 9,267,572 B2 | 2/2016 | Barker et al. |
| 9,277,880 B2 | 3/2016 | Poeze et al. |
| 9,289,167 B2 | 3/2016 | Diab et al. |
| 9,295,421 B2 | 3/2016 | Kiani et al. |
| 9,307,928 B1 | 4/2016 | Al-Ali et al. |
| 9,323,894 B2 | 4/2016 | Kiani |
| D755,392 S | 5/2016 | Hwang et al. |
| 9,326,712 B1 | 5/2016 | Kiani |
| 9,333,316 B2 | 5/2016 | Kiani |
| 9,339,220 B2 | 5/2016 | Lamego et al. |
| 9,341,565 B2 | 5/2016 | Lamego et al. |
| 9,351,673 B2 | 5/2016 | Diab et al. |
| 9,351,675 B2 | 5/2016 | Al-Ali et al. |
| 9,364,181 B2 | 6/2016 | Kiani et al. |
| 9,368,671 B2 | 6/2016 | Wojtczuk et al. |
| 9,370,325 B2 | 6/2016 | Al-Ali et al. |
| 9,370,326 B2 | 6/2016 | McHale et al. |
| 9,370,335 B2 | 6/2016 | Al-Ali et al. |
| 9,375,185 B2 | 6/2016 | Ali et al. |
| 9,386,953 B2 | 7/2016 | Al-Ali |
| 9,386,961 B2 | 7/2016 | Al-Ali et al. |
| 9,392,945 B2 | 7/2016 | Al-Ali et al. |
| 9,397,448 B2 | 7/2016 | Al-Ali et al. |
| 9,408,542 B1 | 8/2016 | Kinast et al. |
| 9,436,645 B2 | 9/2016 | Al-Ali et al. |
| 9,445,759 B1 | 9/2016 | Lamego et al. |
| 9,466,919 B2 | 10/2016 | Kiani et al. |
| 9,474,474 B2 | 10/2016 | Lamego et al. |
| 9,480,422 B2 | 11/2016 | Al-Ali |
| 9,480,435 B2 | 11/2016 | Olsen |
| 9,492,110 B2 | 11/2016 | Al-Ali et al. |
| 9,510,779 B2 | 12/2016 | Poeze et al. |
| 9,517,024 B2 | 12/2016 | Kiani et al. |
| 9,532,722 B2 | 1/2017 | Lamego et al. |
| 9,538,949 B2 | 1/2017 | Al-Ali et al. |
| 9,538,980 B2 | 1/2017 | Telfort et al. |
| 9,549,696 B2 | 1/2017 | Lamego et al. |
| 9,554,737 B2 | 1/2017 | Schurman et al. |
| 9,560,996 B2 | 2/2017 | Kiani |

(56) References Cited

U.S. PATENT DOCUMENTS

| | | |
|---|---|---|
| 9,560,998 B2 | 2/2017 | Al-Ali et al. |
| 9,566,019 B2 | 2/2017 | Al-Ali et al. |
| 9,579,039 B2 | 2/2017 | Jansen et al. |
| 9,591,975 B2 | 3/2017 | Dalvi et al. |
| 9,622,692 B2 | 4/2017 | Lamego et al. |
| 9,622,693 B2 | 4/2017 | Diab |
| D788,312 S | 5/2017 | Al-Ali et al. |
| 9,636,055 B2 | 5/2017 | Al Ali et al. |
| 9,636,056 B2 | 5/2017 | Al-Ali |
| 9,649,054 B2 | 5/2017 | Lamego et al. |
| 9,662,052 B2 | 5/2017 | Al-Ali et al. |
| 9,668,679 B2 | 6/2017 | Schurman et al. |
| 9,668,680 B2 | 6/2017 | Bruinsma et al. |
| 9,668,703 B2 | 6/2017 | Al-Ali |
| 9,675,286 B2 | 6/2017 | Diab |
| 9,687,160 B2 | 6/2017 | Kiani |
| 9,693,719 B2 | 7/2017 | Al-Ali et al. |
| 9,693,737 B2 | 7/2017 | Al-Ali |
| 9,697,928 B2 | 7/2017 | Al-Ali et al. |
| 9,717,425 B2 | 8/2017 | Kiani et al. |
| 9,717,458 B2 | 8/2017 | Lamego et al. |
| 9,724,016 B1 | 8/2017 | Al-Ali et al. |
| 9,724,024 B2 | 8/2017 | Al-Ali |
| 9,724,025 B1 | 8/2017 | Kiani et al. |
| 9,730,640 B2 | 8/2017 | Diab et al. |
| 9,743,887 B2 | 8/2017 | Al-Ali et al. |
| 9,749,232 B2 | 8/2017 | Sampath et al. |
| 9,750,442 B2 | 9/2017 | Olsen |
| 9,750,443 B2 | 9/2017 | Smith et al. |
| 9,750,461 B1 | 9/2017 | Telfort |
| 9,775,545 B2 | 10/2017 | Al-Ali et al. |
| 9,775,546 B2 | 10/2017 | Diab et al. |
| 9,775,570 B2 | 10/2017 | Al-Ali |
| 9,778,079 B1 | 10/2017 | Al-Ali et al. |
| 9,782,077 B2 | 10/2017 | Lamego et al. |
| 9,782,110 B2 | 10/2017 | Kiani |
| 9,787,568 B2 | 10/2017 | Lamego et al. |
| 9,788,735 B2 | 10/2017 | Al-Ali |
| 9,788,768 B2 | 10/2017 | Al-Ali et al. |
| 9,795,300 B2 | 10/2017 | Al-Ali |
| 9,795,310 B2 | 10/2017 | Al-Ali |
| 9,795,358 B2 | 10/2017 | Telfort et al. |
| 9,795,739 B2 | 10/2017 | Al-Ali et al. |
| 9,801,556 B2 | 10/2017 | Kiani |
| 9,801,588 B2 | 10/2017 | Weber et al. |
| 9,808,188 B1 | 11/2017 | Perea et al. |
| 9,814,418 B2 | 11/2017 | Weber et al. |
| 9,820,691 B2 | 11/2017 | Kiani |
| 9,833,152 B2 | 12/2017 | Kiani et al. |
| 9,833,180 B2 | 12/2017 | Shakespeare et al. |
| 9,839,379 B2 | 12/2017 | Al-Ali et al. |
| 9,839,381 B1 | 12/2017 | Weber et al. |
| 9,847,002 B2 | 12/2017 | Kiani et al. |
| 9,847,749 B2 | 12/2017 | Kiani et al. |
| 9,848,800 B1 | 12/2017 | Lee et al. |
| 9,848,806 B2 | 12/2017 | Al-Ali |
| 9,848,807 B2 | 12/2017 | Lamego |
| 9,861,298 B2 | 1/2018 | Eckerbom et al. |
| 9,861,304 B2 | 1/2018 | Al-Ali et al. |
| 9,861,305 B1 | 1/2018 | Weber et al. |
| 9,867,578 B2 | 1/2018 | Al-Ali et al. |
| 9,872,623 B2 | 1/2018 | Al-Ali |
| 9,876,320 B2 | 1/2018 | Coverston et al. |
| 9,877,650 B2 | 1/2018 | Muhsin et al. |
| 9,877,686 B2 | 1/2018 | Al-Ali et al. |
| 9,891,079 B2 | 2/2018 | Dalvi |
| 9,895,107 B2 | 2/2018 | Al-Ali et al. |
| 9,913,617 B2 | 3/2018 | Al-Ali et al. |
| 9,924,893 B2 | 3/2018 | Schurman et al. |
| 9,924,897 B1 | 3/2018 | Abdul-Hafiz |
| 9,936,917 B2 | 4/2018 | Poeze et al. |
| 9,943,269 B2 | 4/2018 | Muhsin et al. |
| 9,949,676 B2 | 4/2018 | Al-Ali |
| 9,955,937 B2 | 5/2018 | Telfort |
| 9,965,946 B2 | 5/2018 | Al-Ali et al. |
| 9,980,667 B2 | 5/2018 | Kiani et al. |
| D820,865 S | 6/2018 | Muhsin et al. |
| 9,986,919 B2 | 6/2018 | Lamego et al. |
| 9,986,952 B2 | 6/2018 | Dalvi et al. |
| 9,989,560 B2 | 6/2018 | Poeze et al. |
| 9,993,207 B2 | 6/2018 | Al-Ali et al. |
| 10,007,758 B2 | 6/2018 | Al-Ali et al. |
| D822,215 S | 7/2018 | Al-Ali et al. |
| D822,216 S | 7/2018 | Barker et al. |
| 10,010,276 B2 | 7/2018 | Al-Ali et al. |
| 10,032,002 B2 | 7/2018 | Kiani et al. |
| 10,039,482 B2 | 8/2018 | Al-Ali et al. |
| 10,052,037 B2 | 8/2018 | Kinast et al. |
| 10,058,275 B2 | 8/2018 | Al-Ali et al. |
| 10,064,562 B2 | 9/2018 | Al-Ali |
| 10,086,138 B1 | 10/2018 | Novak, Jr. |
| 10,092,200 B2 | 10/2018 | Al-Ali et al. |
| 10,092,249 B2 | 10/2018 | Kiani et al. |
| 10,098,550 B2 | 10/2018 | Al-Ali et al. |
| 10,098,591 B2 | 10/2018 | Al-Ali et al. |
| 10,098,610 B2 | 10/2018 | Al-Ali et al. |
| 10,111,591 B2 | 10/2018 | Dyell et al. |
| D833,624 S | 11/2018 | DeJong et al. |
| 10,123,726 B2 | 11/2018 | Al-Ali et al. |
| 10,123,729 B2 | 11/2018 | Dyell et al. |
| 10,130,289 B2 | 11/2018 | Al-Ali et al. |
| 10,130,291 B2 | 11/2018 | Schurman et al. |
| D835,282 S | 12/2018 | Barker et al. |
| D835,283 S | 12/2018 | Barker et al. |
| D835,284 S | 12/2018 | Barker et al. |
| D835,285 S | 12/2018 | Barker et al. |
| 10,149,616 B2 | 12/2018 | Al-Ali et al. |
| 10,154,815 B2 | 12/2018 | Al-Ali et al. |
| 10,159,412 B2 | 12/2018 | Lamego et al. |
| 10,188,296 B2 | 1/2019 | Al-Ali et al. |
| 10,188,331 B1 | 1/2019 | Kiani et al. |
| 10,188,348 B2 | 1/2019 | Al-Ali et al. |
| RE47,218 E | 2/2019 | Al-Ali |
| RE47,244 E | 2/2019 | Kiani et al. |
| RE47,249 E | 2/2019 | Kiani et al. |
| 10,194,847 B2 | 2/2019 | Al-Ali |
| 10,194,848 B1 | 2/2019 | Kiani et al. |
| 10,201,298 B2 | 2/2019 | Al-Ali et al. |
| 10,205,272 B2 | 2/2019 | Kiani et al. |
| 10,205,291 B2 | 2/2019 | Scruggs et al. |
| 10,213,108 B2 | 2/2019 | Al-Ali |
| 10,219,706 B2 | 3/2019 | Al-Ali |
| 10,219,746 B2 | 3/2019 | McHale et al. |
| 10,226,187 B2 | 3/2019 | Al-Ali et al. |
| 10,226,576 B2 | 3/2019 | Kiani |
| 10,231,657 B2 | 3/2019 | Al-Ali et al. |
| 10,231,670 B2 | 3/2019 | Blank et al. |
| 10,231,676 B2 | 3/2019 | Al-Ali et al. |
| RE47,353 E | 4/2019 | Kiani et al. |
| 10,251,585 B2 | 4/2019 | Al-Ali et al. |
| 10,251,586 B2 | 4/2019 | Lamego |
| 10,255,994 B2 | 4/2019 | Sampath et al. |
| 10,258,265 B1 | 4/2019 | Poeze et al. |
| 10,258,266 B1 | 4/2019 | Poeze et al. |
| 10,271,748 B2 | 4/2019 | Al-Ali |
| 10,278,626 B2 | 5/2019 | Schurman et al. |
| 10,278,648 B2 | 5/2019 | Al-Ali et al. |
| 10,279,247 B2 | 5/2019 | Kiani |
| 10,292,628 B1 | 5/2019 | Poeze et al. |
| 10,292,657 B2 | 5/2019 | Abdul-Hafiz et al. |
| 10,292,664 B2 | 5/2019 | Al-Ali |
| 10,299,708 B1 | 5/2019 | Poeze et al. |
| 10,299,709 B2 | 5/2019 | Perea et al. |
| 10,299,720 B2 | 5/2019 | Brown et al. |
| 10,305,775 B2 | 5/2019 | Lamego et al. |
| 10,307,111 B2 | 6/2019 | Muhsin et al. |
| 10,325,681 B2 | 6/2019 | Sampath et al. |
| 10,327,337 B2 | 6/2019 | Schmidt et al. |
| 10,327,713 B2 | 6/2019 | Barker et al. |
| 10,332,630 B2 | 6/2019 | Al-Ali |
| 10,335,033 B2 | 7/2019 | Al-Ali |
| 10,335,068 B2 | 7/2019 | Poeze et al. |
| 10,335,072 B2 | 7/2019 | Al-Ali et al. |
| 10,342,470 B2 | 7/2019 | Al-Ali et al. |

(56) References Cited

U.S. PATENT DOCUMENTS

| | | |
|---|---|---|
| 10,342,487 B2 | 7/2019 | Al-Ali et al. |
| 10,342,497 B2 | 7/2019 | Al-Ali et al. |
| 10,349,895 B2 | 7/2019 | Telfort et al. |
| 10,349,898 B2 | 7/2019 | Al-Ali et al. |
| 10,354,504 B2 | 7/2019 | Kiani et al. |
| 10,357,206 B2 | 7/2019 | Weber et al. |
| 10,383,520 B2 | 8/2019 | Wojtczuk et al. |
| 10,383,527 B2 | 8/2019 | Al-Ali |
| 10,388,120 B2 | 8/2019 | Muhsin et al. |
| D864,120 S | 10/2019 | Forrest et al. |
| 10,441,181 B1 | 10/2019 | Telfort et al. |
| 10,441,196 B2 | 10/2019 | Eckerbom et al. |
| 10,448,844 B2 | 10/2019 | Al-Ali et al. |
| 10,448,871 B2 | 10/2019 | Al-Ali et al. |
| 10,456,038 B2 | 10/2019 | Lamego et al. |
| 10,463,340 B2 | 11/2019 | Telfort et al. |
| 10,471,159 B1 | 11/2019 | Lapotko et al. |
| 10,505,311 B2 | 12/2019 | Al-Ali et al. |
| 10,524,738 B2 | 1/2020 | Olsen |
| 10,532,174 B2 | 1/2020 | Al-Ali |
| 10,537,285 B2 | 1/2020 | Shreim et al. |
| 10,542,903 B2 | 1/2020 | Al-Ali et al. |
| 10,555,678 B2 | 2/2020 | Dalvi et al. |
| 10,568,553 B2 | 2/2020 | O'Neil et al. |
| RE47,882 E | 3/2020 | Al-Ali |
| 10,608,817 B2 | 3/2020 | Haider et al. |
| D880,477 S | 4/2020 | Forrest et al. |
| 10,617,302 B2 | 4/2020 | Al-Ali et al. |
| 10,617,335 B2 | 4/2020 | Al-Ali et al. |
| 10,637,181 B2 | 4/2020 | Al-Ali et al. |
| D886,849 S | 6/2020 | Muhsin et al. |
| D887,548 S | 6/2020 | Abdul-Hafiz et al. |
| D887,549 S | 6/2020 | Abdul-Hafiz et al. |
| 10,667,764 B2 | 6/2020 | Ahmed et al. |
| D890,708 S | 7/2020 | Forrest et al. |
| 10,721,785 B2 | 7/2020 | Al-Ali |
| 10,736,518 B2 | 8/2020 | Al-Ali et al. |
| 10,750,984 B2 | 8/2020 | Pauley et al. |
| D897,098 S | 9/2020 | Al-Ali |
| 10,779,098 B2 | 9/2020 | Iswanto et al. |
| 10,827,961 B1 | 11/2020 | Iyengar et al. |
| 10,828,007 B1 | 11/2020 | Telfort et al. |
| 10,832,818 B2 | 11/2020 | Muhsin et al. |
| 10,849,554 B2 | 12/2020 | Shreim et al. |
| 10,856,750 B2 | 12/2020 | Indorf |
| D906,970 S | 1/2021 | Forrest et al. |
| D908,213 S | 1/2021 | Abdul-Hafiz et al. |
| 10,918,281 B2 | 2/2021 | Al-Ali et al. |
| 10,932,705 B2 | 3/2021 | Muhsin et al. |
| 10,932,729 B2 | 3/2021 | Kiani et al. |
| 10,939,878 B2 | 3/2021 | Kiani et al. |
| 10,956,950 B2 | 3/2021 | Al-Ali et al. |
| D916,135 S | 4/2021 | Indorf et al. |
| D917,046 S | 4/2021 | Abdul-Hafiz et al. |
| D917,550 S | 4/2021 | Indorf et al. |
| D917,564 S | 4/2021 | Indorf et al. |
| D917,704 S | 4/2021 | Al-Ali et al. |
| 10,987,066 B2 | 4/2021 | Chandran et al. |
| 10,991,135 B2 | 4/2021 | Al-Ali et al. |
| D919,094 S | 5/2021 | Al-Ali et al. |
| D919,100 S | 5/2021 | Al-Ali et al. |
| 11,006,867 B2 | 5/2021 | Al-Ali |
| D921,202 S | 6/2021 | Al-Ali et al. |
| 11,024,064 B2 | 6/2021 | Muhsin et al. |
| 11,026,604 B2 | 6/2021 | Chen et al. |
| D925,597 S | 7/2021 | Chandran et al. |
| D927,699 S | 8/2021 | Al-Ali et al. |
| 11,076,777 B2 | 8/2021 | Lee et al. |
| 11,114,188 B2 | 9/2021 | Poeze et al. |
| D933,232 S | 10/2021 | Al-Ali et al. |
| D933,233 S | 10/2021 | Al-Ali et al. |
| D933,234 S | 10/2021 | Al-Ali et al. |
| 11,145,408 B2 | 10/2021 | Sampath et al. |
| 11,147,518 B1 | 10/2021 | Al-Ali et al. |
| 11,185,262 B2 | 11/2021 | Al-Ali et al. |
| 11,191,484 B2 | 12/2021 | Kiani et al. |
| D946,596 S | 3/2022 | Ahmed |
| D946,597 S | 3/2022 | Ahmed |
| D946,598 S | 3/2022 | Ahmed |
| D946,617 S | 3/2022 | Ahmed |
| 11,272,839 B2 | 3/2022 | Al-Ali et al. |
| 11,289,199 B2 | 3/2022 | Al-Ali |
| RE49,034 E | 4/2022 | Al-Ali |
| 11,298,021 B2 | 4/2022 | Muhsin et al. |
| D950,580 S | 5/2022 | Ahmed |
| D950,599 S | 5/2022 | Ahmed |
| D950,738 S | 5/2022 | Al-Ali et al. |
| D957,648 S | 7/2022 | Al-Ali |
| 11,382,567 B2 | 7/2022 | O'Brien et al. |
| 11,389,093 B2 | 7/2022 | Triman et al. |
| 11,406,286 B2 | 8/2022 | Al-Ali et al. |
| 11,410,507 B2 | 8/2022 | Muhsin et al. |
| 11,417,426 B2 | 8/2022 | Muhsin et al. |
| 11,439,329 B2 | 9/2022 | Lamego |
| 11,445,948 B2 | 9/2022 | Scruggs et al. |
| D965,789 S | 10/2022 | Al-Ali et al. |
| D967,433 S | 10/2022 | Al-Ali et al. |
| 11,464,410 B2 | 10/2022 | Muhsin |
| 11,504,058 B1 | 11/2022 | Sharma et al. |
| 11,504,066 B1 | 11/2022 | Dalvi et al. |
| D971,933 S | 12/2022 | Ahmed |
| D973,072 S | 12/2022 | Ahmed |
| D973,685 S | 12/2022 | Ahmed |
| D973,686 S | 12/2022 | Ahmed |
| D974,193 S | 1/2023 | Forrest et al. |
| D979,516 S | 2/2023 | Al-Ali et al. |
| D980,091 S | 3/2023 | Forrest et al. |
| 11,596,363 B2 | 3/2023 | Lamego |
| 11,627,919 B2 | 4/2023 | Kiani et al. |
| 11,637,437 B2 | 4/2023 | Al-Ali et al. |
| D985,498 S | 5/2023 | Al-Ali et al. |
| 11,653,862 B2 | 5/2023 | Dalvi et al. |
| D989,112 S | 6/2023 | Muhsin et al. |
| D989,327 S | 6/2023 | Al-Ali et al. |
| 11,678,829 B2 | 6/2023 | Al-Ali et al. |
| 11,679,579 B2 | 6/2023 | Al-Ali |
| 11,684,296 B2 | 6/2023 | Vo et al. |
| 11,692,934 B2 | 7/2023 | Normand et al. |
| 11,701,043 B2 | 7/2023 | Al-Ali et al. |
| D997,365 S | 8/2023 | Hwang |
| 11,721,105 B2 | 8/2023 | Ranasinghe et al. |
| 11,730,379 B2 | 8/2023 | Ahmed et al. |
| D998,625 S | 9/2023 | Indorf et al. |
| D998,630 S | 9/2023 | Indorf et al. |
| D998,631 S | 9/2023 | Indorf et al. |
| D999,244 S | 9/2023 | Indorf et al. |
| D999,245 S | 9/2023 | Indorf et al. |
| D999,246 S | 9/2023 | Indorf et al. |
| 11,766,198 B2 | 9/2023 | Pauley et al. |
| D1,000,975 S | 10/2023 | Al-Ali et al. |
| 11,803,623 B2 | 10/2023 | Kiani et al. |
| 11,830,349 B2 | 11/2023 | Muhsin et al. |
| 11,832,940 B2 | 12/2023 | Diab et al. |
| D1,013,179 S | 1/2024 | Al-Ali et al. |
| 11,872,156 B2 | 1/2024 | Telfort et al. |
| 11,879,960 B2 | 1/2024 | Ranasinghe et al. |
| 11,883,129 B2 | 1/2024 | Olsen |
| D1,022,729 S | 4/2024 | Forrest et al. |
| 11,951,186 B2 | 4/2024 | Krishnamani et al. |
| 11,974,833 B2 | 5/2024 | Forrest et al. |
| 11,986,067 B2 | 5/2024 | Al-Ali et al. |
| 11,986,289 B2 | 5/2024 | Dalvi et al. |
| 11,986,305 B2 | 5/2024 | Al-Ali et al. |
| D1,031,729 S | 6/2024 | Forrest et al. |
| 12,004,869 B2 | 6/2024 | Kiani et al. |
| 12,014,328 B2 | 6/2024 | Wachman et al. |
| D1,036,293 S | 7/2024 | Al-Ali et al. |
| D1,037,462 S | 7/2024 | Al-Ali et al. |
| 12,029,844 B2 | 7/2024 | Pauley et al. |
| 12,048,534 B2 | 7/2024 | Vo et al. |
| 12,064,217 B2 | 8/2024 | Ahmed et al. |
| 12,066,426 B1 | 8/2024 | Lapotko et al. |
| D1,041,511 S | 9/2024 | Indorf et al. |
| D1,042,596 S | 9/2024 | DeJong et al. |

(56) References Cited

U.S. PATENT DOCUMENTS

| | | |
|---|---|---|
| D1,042,852 S | 9/2024 | Hwang |
| 12,076,159 B2 | 9/2024 | Belur Nagaraj et al. |
| 12,082,926 B2 | 9/2024 | Sharma et al. |
| D1,044,828 S | 10/2024 | Chandran et al. |
| D1,048,571 S | 10/2024 | Yu et al. |
| D1,048,908 S | 10/2024 | Al-Ali et al. |
| 12,106,752 B2 | 10/2024 | Campbell et al. |
| 12,114,974 B2 | 10/2024 | Al-Ali et al. |
| 12,126,683 B2 | 10/2024 | Koo et al. |
| 12,127,838 B2 | 10/2024 | Olsen et al. |
| 12,128,213 B2 | 10/2024 | Kiani et al. |
| 12,131,661 B2 | 10/2024 | Pauley et al. |
| D1,050,910 S | 11/2024 | Al-Ali et al. |
| 12,178,572 B1 | 12/2024 | Pauley et al. |
| 12,178,581 B2 | 12/2024 | Telfort et al. |
| 12,178,852 B2 | 12/2024 | Kiani et al. |
| D1,057,159 S | 1/2025 | DeJong et al. |
| D1,057,160 S | 1/2025 | DeJong et al. |
| 12,198,790 B1 | 1/2025 | Al-Ali |
| 12,200,421 B2 | 1/2025 | Campbell et al. |
| 12,207,901 B1 | 1/2025 | Lapotko et al. |
| 2001/0034477 A1 | 10/2001 | Mansfield et al. |
| 2001/0039483 A1 | 11/2001 | Brand et al. |
| 2002/0010401 A1 | 1/2002 | Bushmakin et al. |
| 2002/0058864 A1 | 5/2002 | Mansfield et al. |
| 2002/0133080 A1 | 9/2002 | Apruzzese et al. |
| 2003/0013975 A1 | 1/2003 | Kiani |
| 2003/0018243 A1 | 1/2003 | Gerhardt et al. |
| 2003/0144582 A1 | 7/2003 | Cohen et al. |
| 2003/0156288 A1 | 8/2003 | Barnum et al. |
| 2003/0212312 A1 | 11/2003 | Coffin, IV et al. |
| 2004/0106163 A1 | 6/2004 | Workman, Jr. et al. |
| 2005/0055276 A1 | 3/2005 | Kiani et al. |
| 2005/0234317 A1 | 10/2005 | Kiani |
| 2006/0073719 A1 | 4/2006 | Kiani |
| 2006/0161054 A1 | 7/2006 | Reuss et al. |
| 2006/0189871 A1 | 8/2006 | Al-Ali et al. |
| 2007/0073116 A1 | 3/2007 | Kiani et al. |
| 2007/0180140 A1 | 8/2007 | Welch et al. |
| 2007/0244377 A1 | 10/2007 | Cozad et al. |
| 2007/0282478 A1 | 12/2007 | Al-Ali et al. |
| 2008/0064965 A1 | 3/2008 | Jay et al. |
| 2008/0094228 A1 | 4/2008 | Welch et al. |
| 2008/0103375 A1 | 5/2008 | Kiani |
| 2008/0221418 A1 | 9/2008 | Al-Ali et al. |
| 2009/0036759 A1 | 2/2009 | Ault et al. |
| 2009/0093687 A1 | 4/2009 | Telfort et al. |
| 2009/0095926 A1 | 4/2009 | MacNeish, III |
| 2009/0247984 A1 | 10/2009 | Lamego et al. |
| 2009/0275813 A1 | 11/2009 | Davis |
| 2009/0275844 A1 | 11/2009 | Ai-Ali |
| 2010/0004518 A1 | 1/2010 | Vo et al. |
| 2010/0030040 A1 | 2/2010 | Poeze et al. |
| 2010/0099964 A1 | 4/2010 | O'Reilly et al. |
| 2010/0234718 A1 | 9/2010 | Sampath et al. |
| 2010/0270257 A1 | 10/2010 | Wachman et al. |
| 2011/0028806 A1 | 2/2011 | Merritt et al. |
| 2011/0028809 A1 | 2/2011 | Goodman |
| 2011/0040197 A1 | 2/2011 | Welch et al. |
| 2011/0082711 A1 | 4/2011 | Poeze et al. |
| 2011/0087081 A1 | 4/2011 | Kiani et al. |
| 2011/0118561 A1 | 5/2011 | Tari et al. |
| 2011/0125060 A1 | 5/2011 | Telfort et al. |
| 2011/0137297 A1 | 6/2011 | Kiani et al. |
| 2011/0172498 A1 | 7/2011 | Olsen et al. |
| 2011/0208015 A1 | 8/2011 | Welch et al. |
| 2011/0230733 A1 | 9/2011 | Al-Ali |
| 2012/0123231 A1 | 5/2012 | O'Reilly |
| 2012/0165629 A1 | 6/2012 | Merritt et al. |
| 2012/0209082 A1 | 8/2012 | Al-Ali |
| 2012/0209084 A1 | 8/2012 | Olsen et al. |
| 2012/0226117 A1 | 9/2012 | Lamego et al. |
| 2012/0283524 A1 | 11/2012 | Kiani et al. |
| 2013/0023775 A1 | 1/2013 | Lamego et al. |
| 2013/0041591 A1 | 2/2013 | Lamego |
| 2013/0060147 A1 | 3/2013 | Welch et al. |
| 2013/0096405 A1 | 4/2013 | Garfio |
| 2013/0096936 A1 | 4/2013 | Sampath et al. |
| 2013/0243021 A1 | 9/2013 | Siskavich |
| 2013/0253334 A1 | 9/2013 | Al-Ali et al. |
| 2013/0296672 A1 | 11/2013 | O'Neil et al. |
| 2013/0296713 A1 | 11/2013 | Al-Ali et al. |
| 2013/0324808 A1 | 12/2013 | Al-Ali et al. |
| 2013/0331660 A1 | 12/2013 | Al-Ali et al. |
| 2013/0345921 A1 | 12/2013 | Al-Ali et al. |
| 2014/0012100 A1 | 1/2014 | Al-Ali et al. |
| 2014/0028464 A1 | 1/2014 | Garibaldi |
| 2014/0051953 A1 | 2/2014 | Lamego et al. |
| 2014/0120564 A1 | 5/2014 | Workman et al. |
| 2014/0121482 A1 | 5/2014 | Merritt et al. |
| 2014/0127137 A1 | 5/2014 | Bellott et al. |
| 2014/0163344 A1 | 6/2014 | Al-Ali |
| 2014/0166076 A1 | 6/2014 | Kiani et al. |
| 2014/0171763 A1 | 6/2014 | Diab |
| 2014/0180038 A1 | 6/2014 | Kiani |
| 2014/0180154 A1 | 6/2014 | Sierra et al. |
| 2014/0180160 A1 | 6/2014 | Brown et al. |
| 2014/0187973 A1 | 7/2014 | Brown et al. |
| 2014/0213864 A1 | 7/2014 | Abdul-Hafiz et al. |
| 2014/0274211 A1 | 9/2014 | Sejnoha et al. |
| 2014/0275835 A1 | 9/2014 | Lamego et al. |
| 2014/0275871 A1 | 9/2014 | Lamego et al. |
| 2014/0275872 A1 | 9/2014 | Merritt et al. |
| 2014/0288400 A1 | 9/2014 | Diab et al. |
| 2014/0316217 A1 | 10/2014 | Purdon et al. |
| 2014/0316218 A1 | 10/2014 | Purdon et al. |
| 2014/0316228 A1 | 10/2014 | Blank et al. |
| 2014/0323825 A1 | 10/2014 | Al-Ali et al. |
| 2014/0323897 A1 | 10/2014 | Brown et al. |
| 2014/0323898 A1 | 10/2014 | Purdon et al. |
| 2014/0330092 A1 | 11/2014 | Al-Ali et al. |
| 2014/0330098 A1 | 11/2014 | Merritt et al. |
| 2014/0357966 A1 | 12/2014 | Al-Ali et al. |
| 2015/0005600 A1 | 1/2015 | Blank et al. |
| 2015/0011907 A1 | 1/2015 | Purdon et al. |
| 2015/0032029 A1 | 1/2015 | Al-Ali et al. |
| 2015/0038859 A1 | 2/2015 | Dalvi et al. |
| 2015/0073241 A1 | 3/2015 | Lamego |
| 2015/0080754 A1 | 3/2015 | Purdon et al. |
| 2015/0087936 A1 | 3/2015 | Al-Ali et al. |
| 2015/0094546 A1 | 4/2015 | Al-Ali |
| 2015/0099950 A1 | 4/2015 | Al-Ali et al. |
| 2015/0101844 A1 | 4/2015 | Al-Ali et al. |
| 2015/0106121 A1 | 4/2015 | Muhsin et al. |
| 2015/0112151 A1 | 4/2015 | Muhsin et al. |
| 2015/0165312 A1 | 6/2015 | Kiani |
| 2015/0190063 A1* | 7/2015 | Zakharov ............. A61B 5/1107 600/479 |
| 2015/0196249 A1 | 7/2015 | Brown et al. |
| 2015/0216459 A1 | 8/2015 | Al-Ali et al. |
| 2015/0238722 A1 | 8/2015 | Al-Ali |
| 2015/0245773 A1 | 9/2015 | Lamego et al. |
| 2015/0245794 A1 | 9/2015 | Al-Ali |
| 2015/0254944 A1 | 9/2015 | Delsing et al. |
| 2015/0257689 A1 | 9/2015 | Al-Ali et al. |
| 2015/0272514 A1 | 10/2015 | Kiani et al. |
| 2015/0351697 A1 | 12/2015 | Weber et al. |
| 2015/0359429 A1 | 12/2015 | Al-Ali et al. |
| 2015/0366507 A1 | 12/2015 | Blank et al. |
| 2016/0029932 A1 | 2/2016 | Al-Ali |
| 2016/0058347 A1 | 3/2016 | Reichgott et al. |
| 2016/0066824 A1 | 3/2016 | Al-Ali et al. |
| 2016/0081552 A1 | 3/2016 | Wojtczuk et al. |
| 2016/0095543 A1 | 4/2016 | Telfort et al. |
| 2016/0095548 A1 | 4/2016 | Al-Ali et al. |
| 2016/0103598 A1 | 4/2016 | Al-Ali et al. |
| 2016/0119210 A1* | 4/2016 | Koehler ............. H04L 43/0817 370/245 |
| 2016/0166182 A1 | 6/2016 | Al-Ali et al. |
| 2016/0166183 A1 | 6/2016 | Poeze et al. |
| 2016/0179460 A1* | 6/2016 | MacDonald ......... A61B 5/0205 381/107 |
| 2016/0196388 A1 | 7/2016 | Lamego |
| 2016/0197436 A1 | 7/2016 | Barker et al. |

(56) References Cited

U.S. PATENT DOCUMENTS

| | | |
|---|---|---|
| 2016/0213281 A1 | 7/2016 | Eckerbom et al. |
| 2016/0228043 A1 | 8/2016 | O'Neil et al. |
| 2016/0233632 A1 | 8/2016 | Scruggs et al. |
| 2016/0234944 A1 | 8/2016 | Schmidt et al. |
| 2016/0270735 A1 | 9/2016 | Diab et al. |
| 2016/0283665 A1 | 9/2016 | Sampath et al. |
| 2016/0284198 A1 | 9/2016 | Tarn et al. |
| 2016/0287090 A1 | 10/2016 | Al-Ali et al. |
| 2016/0287786 A1 | 10/2016 | Kiani |
| 2016/0296169 A1 | 10/2016 | McHale et al. |
| 2016/0310052 A1 | 10/2016 | Al-Ali et al. |
| 2016/0314260 A1 | 10/2016 | Kiani |
| 2016/0324488 A1 | 11/2016 | Olsen |
| 2016/0327984 A1 | 11/2016 | Al-Ali et al. |
| 2016/0328529 A1* | 11/2016 | Kaib .................. G16H 40/40 |
| 2016/0331332 A1 | 11/2016 | Al-Ali |
| 2016/0367173 A1 | 12/2016 | Dalvi et al. |
| 2017/0000394 A1 | 1/2017 | Al-Ali et al. |
| 2017/0007134 A1 | 1/2017 | Al-Ali et al. |
| 2017/0007198 A1 | 1/2017 | Al-Ali et al. |
| 2017/0014083 A1 | 1/2017 | Diab et al. |
| 2017/0014084 A1 | 1/2017 | Al-Ali et al. |
| 2017/0024748 A1 | 1/2017 | Haider |
| 2017/0039822 A1* | 2/2017 | Schlesinger .......... A61B 5/746 |
| 2017/0042488 A1 | 2/2017 | Muhsin |
| 2017/0055851 A1 | 3/2017 | Al-Ali |
| 2017/0055882 A1 | 3/2017 | Al-Ali et al. |
| 2017/0055887 A1 | 3/2017 | Al-Ali |
| 2017/0055896 A1 | 3/2017 | Al-Ali |
| 2017/0064448 A1 | 3/2017 | Kawamura et al. |
| 2017/0065757 A1 | 3/2017 | Tanenbaum et al. |
| 2017/0079594 A1 | 3/2017 | Telfort et al. |
| 2017/0086723 A1 | 3/2017 | Al-Ali et al. |
| 2017/0143281 A1 | 5/2017 | Olsen |
| 2017/0147774 A1 | 5/2017 | Kiani |
| 2017/0156620 A1 | 6/2017 | Al-Ali et al. |
| 2017/0173632 A1 | 6/2017 | Al-Ali |
| 2017/0187146 A1 | 6/2017 | Kiani et al. |
| 2017/0188919 A1 | 7/2017 | Al-Ali et al. |
| 2017/0196464 A1 | 7/2017 | Jansen et al. |
| 2017/0196470 A1 | 7/2017 | Lamego et al. |
| 2017/0224262 A1 | 8/2017 | Al-Ali |
| 2017/0228516 A1 | 8/2017 | Sampath et al. |
| 2017/0245790 A1 | 8/2017 | Al-Ali et al. |
| 2017/0251974 A1 | 9/2017 | Shreim et al. |
| 2017/0251975 A1 | 9/2017 | Shreim et al. |
| 2017/0258403 A1 | 9/2017 | Abdul-Hafiz et al. |
| 2017/0311851 A1 | 11/2017 | Schurman et al. |
| 2017/0311891 A1 | 11/2017 | Kiani et al. |
| 2017/0325728 A1 | 11/2017 | Al-Ali et al. |
| 2017/0332976 A1 | 11/2017 | Al-Ali |
| 2017/0340293 A1 | 11/2017 | Al-Ali et al. |
| 2017/0360310 A1 | 12/2017 | Kiani |
| 2017/0367632 A1 | 12/2017 | Al-Ali et al. |
| 2018/0008146 A1 | 1/2018 | Al-Ali et al. |
| 2018/0013562 A1 | 1/2018 | Haider et al. |
| 2018/0014752 A1 | 1/2018 | Al-Ali et al. |
| 2018/0028124 A1 | 2/2018 | Al-Ali et al. |
| 2018/0055385 A1 | 3/2018 | Al-Ali |
| 2018/0055390 A1 | 3/2018 | Kiani et al. |
| 2018/0055430 A1 | 3/2018 | Diab et al. |
| 2018/0064381 A1 | 3/2018 | Shakespeare et al. |
| 2018/0069776 A1 | 3/2018 | Lamego et al. |
| 2018/0070867 A1 | 3/2018 | Smith et al. |
| 2018/0075203 A1 | 3/2018 | West |
| 2018/0082767 A1 | 3/2018 | Al-Ali et al. |
| 2018/0085068 A1 | 3/2018 | Telfort |
| 2018/0087937 A1 | 3/2018 | Al-Ali et al. |
| 2018/0103874 A1 | 4/2018 | Lee et al. |
| 2018/0103905 A1 | 4/2018 | Kiani |
| 2018/0110478 A1 | 4/2018 | Al-Ali |
| 2018/0116575 A1 | 5/2018 | Perea et al. |
| 2018/0125368 A1 | 5/2018 | Lamego et al. |
| 2018/0125430 A1 | 5/2018 | Al-Ali et al. |
| 2018/0125445 A1 | 5/2018 | Telfort et al. |
| 2018/0130325 A1 | 5/2018 | Kiani et al. |
| 2018/0132769 A1 | 5/2018 | Weber et al. |
| 2018/0132770 A1 | 5/2018 | Lamego |
| 2018/0139565 A1 | 5/2018 | Norris et al. |
| 2018/0146901 A1 | 5/2018 | Al-Ali et al. |
| 2018/0146902 A1 | 5/2018 | Kiani et al. |
| 2018/0153442 A1 | 6/2018 | Eckerbom et al. |
| 2018/0153446 A1 | 6/2018 | Kiani |
| 2018/0153447 A1 | 6/2018 | Al-Ali et al. |
| 2018/0153448 A1 | 6/2018 | Weber et al. |
| 2018/0161499 A1 | 6/2018 | Al-Ali et al. |
| 2018/0168491 A1 | 6/2018 | Al-Ali et al. |
| 2018/0174679 A1 | 6/2018 | Sampath et al. |
| 2018/0174680 A1 | 6/2018 | Sampath et al. |
| 2018/0182484 A1 | 6/2018 | Sampath et al. |
| 2018/0184917 A1 | 7/2018 | Kiani |
| 2018/0192924 A1 | 7/2018 | Al-Ali |
| 2018/0192953 A1 | 7/2018 | Shreim et al. |
| 2018/0192955 A1 | 7/2018 | Al-Ali et al. |
| 2018/0199871 A1 | 7/2018 | Pauley et al. |
| 2018/0206795 A1 | 7/2018 | Al-Ali |
| 2018/0206815 A1 | 7/2018 | Telfort |
| 2018/0213583 A1 | 7/2018 | Al-Ali |
| 2018/0214031 A1 | 8/2018 | Kiani et al. |
| 2018/0214090 A1 | 8/2018 | Al-Ali et al. |
| 2018/0218792 A1 | 8/2018 | Muhsin et al. |
| 2018/0225960 A1 | 8/2018 | Al-Ali et al. |
| 2018/0238718 A1 | 8/2018 | Dalvi |
| 2018/0242853 A1 | 8/2018 | Al-Ali |
| 2018/0242921 A1 | 8/2018 | Muhsin et al. |
| 2018/0242923 A1 | 8/2018 | Al-Ali et al. |
| 2018/0242924 A1 | 8/2018 | Barker et al. |
| 2018/0242926 A1 | 8/2018 | Muhsin et al. |
| 2018/0247353 A1 | 8/2018 | Al-Ali et al. |
| 2018/0247712 A1 | 8/2018 | Muhsin et al. |
| 2018/0249933 A1 | 9/2018 | Schurman et al. |
| 2018/0253947 A1 | 9/2018 | Muhsin et al. |
| 2018/0256087 A1 | 9/2018 | Al-Ali et al. |
| 2018/0256113 A1 | 9/2018 | Weber et al. |
| 2018/0285094 A1 | 10/2018 | Housel et al. |
| 2018/0289325 A1 | 10/2018 | Poeze et al. |
| 2018/0289337 A1 | 10/2018 | Al-Ali et al. |
| 2018/0296161 A1 | 10/2018 | Shreim et al. |
| 2018/0300919 A1 | 10/2018 | Muhsin et al. |
| 2018/0310822 A1 | 11/2018 | Indorf et al. |
| 2018/0310823 A1 | 11/2018 | Al-Ali et al. |
| 2018/0317826 A1 | 11/2018 | Muhsin et al. |
| 2018/0317841 A1 | 11/2018 | Novak, Jr. |
| 2018/0333055 A1 | 11/2018 | Lamego et al. |
| 2018/0333087 A1 | 11/2018 | Al-Ali |
| 2019/0000317 A1 | 1/2019 | Muhsin et al. |
| 2019/0000362 A1 | 1/2019 | Kiani et al. |
| 2019/0015023 A1 | 1/2019 | Monfre |
| 2019/0021638 A1 | 1/2019 | Al-Ali et al. |
| 2019/0029574 A1 | 1/2019 | Schurman et al. |
| 2019/0029578 A1 | 1/2019 | Al-Ali et al. |
| 2019/0038143 A1 | 2/2019 | Al-Ali |
| 2019/0058280 A1 | 2/2019 | Al-Ali et al. |
| 2019/0058281 A1 | 2/2019 | Al-Ali et al. |
| 2019/0069813 A1 | 3/2019 | Al-Ali |
| 2019/0069814 A1 | 3/2019 | Al-Ali |
| 2019/0076028 A1 | 3/2019 | Al-Ali et al. |
| 2019/0082979 A1 | 3/2019 | Al-Ali et al. |
| 2019/0090748 A1 | 3/2019 | Al-Ali |
| 2019/0090760 A1 | 3/2019 | Kinast et al. |
| 2019/0090764 A1 | 3/2019 | Al-Ali |
| 2019/0104973 A1 | 4/2019 | Poeze et al. |
| 2019/0110719 A1 | 4/2019 | Poeze et al. |
| 2019/0117070 A1 | 4/2019 | Muhsin et al. |
| 2019/0117139 A1 | 4/2019 | Al-Ali et al. |
| 2019/0117140 A1 | 4/2019 | Al-Ali et al. |
| 2019/0117141 A1 | 4/2019 | Al-Ali |
| 2019/0117930 A1 | 4/2019 | Al-Ali |
| 2019/0122763 A1 | 4/2019 | Sampath et al. |
| 2019/0133525 A1 | 5/2019 | Al-Ali et al. |
| 2019/0142283 A1 | 5/2019 | Lamego et al. |
| 2019/0142344 A1 | 5/2019 | Telfort et al. |
| 2019/0150800 A1 | 5/2019 | Poeze et al. |
| 2019/0150856 A1 | 5/2019 | Kiani et al. |

(56) References Cited

U.S. PATENT DOCUMENTS

| | | |
|---|---|---|
| 2019/0167161 A1 | 6/2019 | Al-Ali et al. |
| 2019/0175019 A1 | 6/2019 | Al-Ali et al. |
| 2019/0192076 A1 | 6/2019 | McHale et al. |
| 2019/0200941 A1 | 7/2019 | Chandran et al. |
| 2019/0201623 A1 | 7/2019 | Kiani |
| 2019/0209025 A1 | 7/2019 | Al-Ali |
| 2019/0214778 A1 | 7/2019 | Scruggs et al. |
| 2019/0216319 A1 | 7/2019 | Poeze et al. |
| 2019/0216379 A1 | 7/2019 | Al-Ali et al. |
| 2019/0221966 A1 | 7/2019 | Kiani et al. |
| 2019/0223804 A1 | 7/2019 | Blank et al. |
| 2019/0239787 A1 | 8/2019 | Pauley et al. |
| 2019/0320906 A1 | 10/2019 | Olsen |
| 2019/0374139 A1 | 12/2019 | Kiani et al. |
| 2019/0374173 A1 | 12/2019 | Kiani et al. |
| 2019/0374713 A1 | 12/2019 | Kiani et al. |
| 2020/0021930 A1 | 1/2020 | Iswanto et al. |
| 2020/0060869 A1 | 2/2020 | Telfort et al. |
| 2020/0074819 A1 | 3/2020 | Muhsin et al. |
| 2020/0111552 A1 | 4/2020 | Ahmed |
| 2020/0113435 A1 | 4/2020 | Muhsin |
| 2020/0113488 A1 | 4/2020 | Al-Ali et al. |
| 2020/0113496 A1 | 4/2020 | Scruggs et al. |
| 2020/0113497 A1 | 4/2020 | Triman et al. |
| 2020/0113520 A1 | 4/2020 | Abdul-Hafiz et al. |
| 2020/0138288 A1 | 5/2020 | Al-Ali et al. |
| 2020/0138368 A1 | 5/2020 | Kiani et al. |
| 2020/0163597 A1 | 5/2020 | Dalvi et al. |
| 2020/0196877 A1 | 6/2020 | Vo et al. |
| 2020/0253474 A1 | 8/2020 | Muhsin et al. |
| 2020/0253544 A1 | 8/2020 | Belur Nagaraj et al. |
| 2020/0275841 A1 | 9/2020 | Telfort et al. |
| 2020/0288983 A1 | 9/2020 | Telfort et al. |
| 2020/0321793 A1 | 10/2020 | Al-Ali et al. |
| 2020/0329983 A1 | 10/2020 | Al-Ali et al. |
| 2020/0329984 A1 | 10/2020 | Al-Ali et al. |
| 2020/0329993 A1 | 10/2020 | Al-Ali et al. |
| 2020/0330037 A1 | 10/2020 | Al-Ali et al. |
| 2021/0022628 A1 | 1/2021 | Telfort et al. |
| 2021/0104173 A1 | 4/2021 | Pauley et al. |
| 2021/0113121 A1 | 4/2021 | Diab et al. |
| 2021/0117525 A1 | 4/2021 | Kiani et al. |
| 2021/0118581 A1 | 4/2021 | Kiani et al. |
| 2021/0121582 A1 | 4/2021 | Krishnamani et al. |
| 2021/0161465 A1 | 6/2021 | Barker et al. |
| 2021/0236729 A1 | 8/2021 | Kiani et al. |
| 2021/0256267 A1 | 8/2021 | Ranasinghe et al. |
| 2021/0256835 A1 | 8/2021 | Ranasinghe et al. |
| 2021/0275101 A1 | 9/2021 | Vo et al. |
| 2021/0290060 A1 | 9/2021 | Ahmed |
| 2021/0290072 A1 | 9/2021 | Forrest |
| 2021/0290080 A1 | 9/2021 | Ahmed |
| 2021/0290120 A1 | 9/2021 | Al-Ali |
| 2021/0290177 A1 | 9/2021 | Novak, Jr. |
| 2021/0290184 A1 | 9/2021 | Ahmed |
| 2021/0296008 A1 | 9/2021 | Novak, Jr. |
| 2021/0330228 A1 | 10/2021 | Olsen et al. |
| 2021/0386382 A1 | 12/2021 | Olsen et al. |
| 2021/0402110 A1 | 12/2021 | Pauley et al. |
| 2022/0026355 A1 | 1/2022 | Normand et al. |
| 2022/0039707 A1 | 2/2022 | Sharma et al. |
| 2022/0053892 A1 | 2/2022 | Al-Ali et al. |
| 2022/0071562 A1 | 3/2022 | Kiani |
| 2022/0096603 A1 | 3/2022 | Kiani et al. |
| 2022/0151521 A1 | 5/2022 | Krishnamani et al. |
| 2022/0218244 A1 | 7/2022 | Kiani et al. |
| 2022/0287574 A1 | 9/2022 | Telfort et al. |
| 2022/0296161 A1 | 9/2022 | Al-Ali et al. |
| 2022/0361819 A1 | 11/2022 | Al-Ali et al. |
| 2022/0379059 A1 | 12/2022 | Yu et al. |
| 2022/0392610 A1 | 12/2022 | Kiani et al. |
| 2023/0028745 A1 | 1/2023 | Al-Ali |
| 2023/0038389 A1 | 2/2023 | Vo |
| 2023/0045647 A1 | 2/2023 | Vo |
| 2023/0058052 A1 | 2/2023 | Al-Ali |
| 2023/0058342 A1 | 2/2023 | Kiani |
| 2023/0069789 A1 | 3/2023 | Koo et al. |
| 2023/0087671 A1 | 3/2023 | Telfort et al. |
| 2023/0110152 A1 | 4/2023 | Forrest et al. |
| 2023/0111198 A1 | 4/2023 | Yu et al. |
| 2023/0115397 A1 | 4/2023 | Vo et al. |
| 2023/0116371 A1 | 4/2023 | Mills et al. |
| 2023/0135297 A1 | 5/2023 | Kiani et al. |
| 2023/0138098 A1 | 5/2023 | Telfort et al. |
| 2023/0145155 A1 | 5/2023 | Krishnamani et al. |
| 2023/0147750 A1 | 5/2023 | Barker et al. |
| 2023/0210417 A1 | 7/2023 | Al-Ali et al. |
| 2023/0222805 A1 | 7/2023 | Muhsin et al. |
| 2023/0222887 A1 | 7/2023 | Muhsin et al. |
| 2023/0226331 A1 | 7/2023 | Kiani et al. |
| 2023/0284916 A1 | 9/2023 | Telfort |
| 2023/0284943 A1 | 9/2023 | Scruggs et al. |
| 2023/0301562 A1 | 9/2023 | Scruggs et al. |
| 2023/0346993 A1 | 11/2023 | Kiani et al. |
| 2023/0368221 A1 | 11/2023 | Haider |
| 2023/0371893 A1 | 11/2023 | Al-Ali et al. |
| 2023/0389837 A1 | 12/2023 | Krishnamani et al. |
| 2024/0016418 A1 | 1/2024 | Devadoss et al. |
| 2024/0016419 A1 | 1/2024 | Devadoss et al. |
| 2024/0047061 A1 | 2/2024 | Al-Ali et al. |
| 2024/0049310 A1 | 2/2024 | Al-Ali et al. |
| 2024/0049986 A1 | 2/2024 | Al-Ali et al. |
| 2024/0081656 A1 | 3/2024 | DeJong et al. |
| 2024/0122486 A1 | 4/2024 | Kiani |
| 2024/0180456 A1 | 6/2024 | Al-Ali |
| 2024/0188872 A1 | 6/2024 | Al-Ali et al. |
| 2024/0245855 A1 | 7/2024 | Vo et al. |
| 2024/0260894 A1 | 8/2024 | Olsen |
| 2024/0267698 A1 | 8/2024 | Telfort et al. |
| 2024/0277233 A1 | 8/2024 | Al-Ali |
| 2024/0277280 A1 | 8/2024 | Al-Ali |
| 2024/0298920 A1 | 9/2024 | Fernkbist et al. |
| 2024/0306985 A1 | 9/2024 | Vo et al. |
| 2024/0324953 A1 | 10/2024 | Telfort |
| 2024/0380246 A1 | 11/2024 | Moran |
| 2024/0380247 A1 | 11/2024 | Moran |
| 2024/0404549 A1 | 12/2024 | Campbell et al. |
| 2025/0000458 A1 | 1/2025 | Abdul-Hafiz et al. |

\* cited by examiner

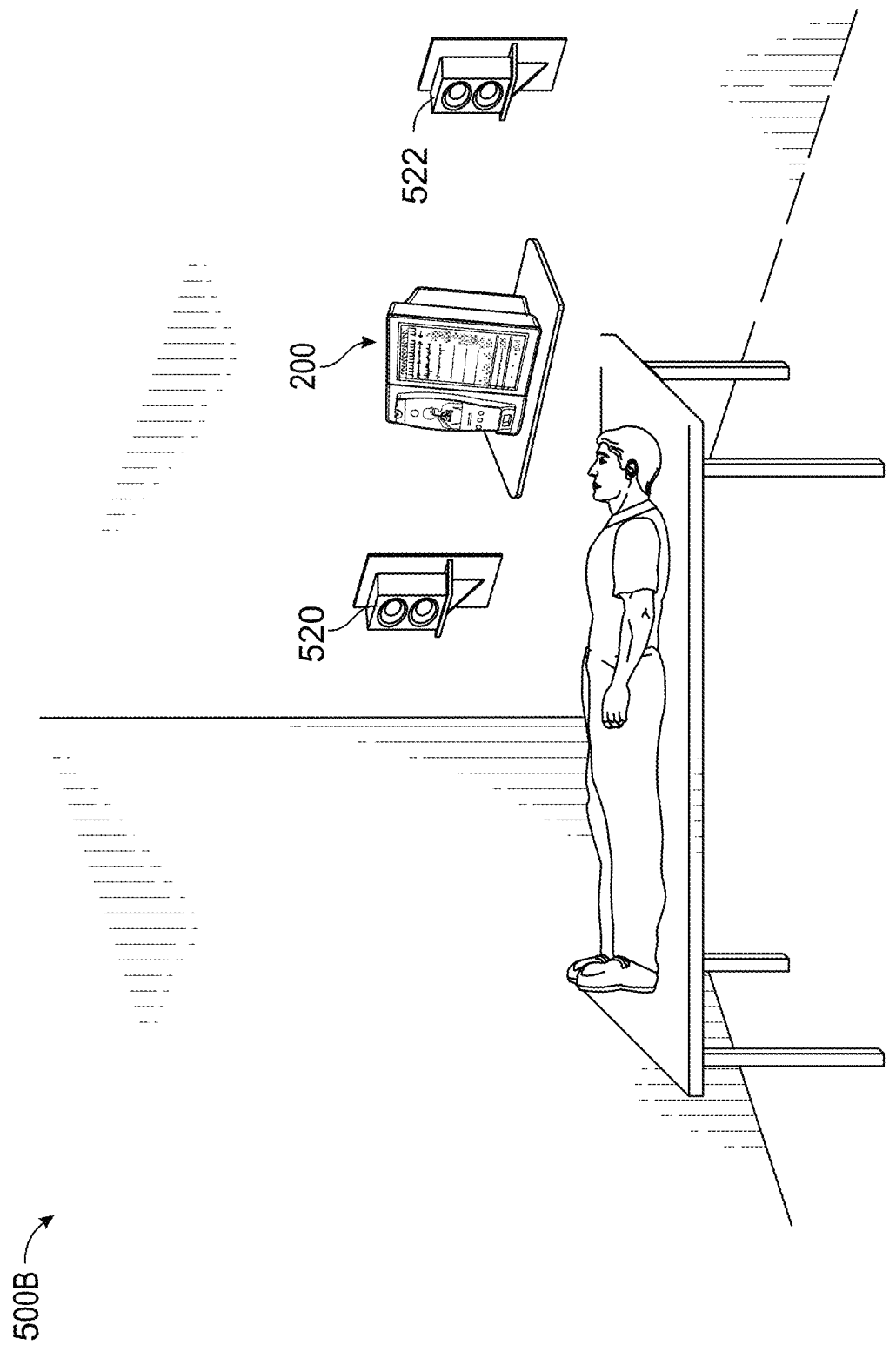

LOCALIZED PROJECTION OF AUDIBLE NOISES IN MEDICAL SETTINGS

RELATED APPLICATIONS

This application is a continuation of U.S. patent application Ser. No. 17/818,295, filed Aug. 8, 2022, entitled "Localized Projection of Audible Noises in Medical Settings," which is a continuation of U.S. patent application Ser. No. 16/533,248, filed Aug. 6, 2019, entitled "Localized Projection of Audible Noises in Medical Settings," which is a continuation of U.S. application Ser. No. 15/905,332, filed Feb. 26, 2018, and issued as U.S. Pat. No. 10,388,120, entitled "Localized Projection Of Audible Noises In Medical Settings," which claims the benefit of U.S. Provisional Application No. 62/463,490, filed Feb. 24, 2017, entitled "Medical Monitoring Hub," each of which are hereby incorporated by reference in their entirety.

TECHNICAL FIELD

The present disclosure relates generally to improvements in patient monitoring devices.

BACKGROUND

Today's patient monitoring environments are crowded with sophisticated and often electronic medical devices servicing a wide variety of monitoring and treatment endeavors for a given patient. Generally, many if not all of the devices are from differing manufactures, and many may be portable devices. The devices may not communicate with one another and each may include its own control, display, alarms, configurations and the like.

The result of such device disparity is often a caregiver environment scattered with multiple displays and alarms leading to a potentially chaotic experience. Such chaos can be detrimental to the patient in many situations including surgical environments where caregiver distraction is unwanted, and including recovery or monitoring environments where patient distraction or disturbance may be unwanted.

SUMMARY

The present disclosure provides for improved monitoring of patients through the use of localized projection of audible noises to direct a care provider quickly and intuitively to a particular direction or location. The system can include a plurality of speakers configured to output auditory signals, and a sound localization controller. The sound localization controller can be in communication with the speakers and can be configured to control the speakers to coordinate the auditory signals to simulate an origination location. The sound localization controller can include a processor that can be configured to receive an indication of an activation of the patient indicator and determine the origination location of the patient indicator based at least in part on the indication of the activation of the patient indicator. Based at least in part on the origination location and a location of each of a plurality of speakers, the processor can identify sound parameters for each of the plurality of speakers. The sound parameters can correspond to at least one of a timing, intensity, or frequency of a sound signal. The processor can determine adjusted auditory signals based at least in part on the identified sound parameters, and can control the plurality of speakers to output the plurality of adjusted auditory signals.

The system of the preceding paragraph may also include any combination of the following features described in this paragraph, among others described herein. The system can further include a patient monitoring device configured to receive one or more patient signals from one or more physiological sensors, determine measurements of physiological parameters of a patient from the received one or more patient signals, monitor patient indicator criteria associated with the one or more measurements of the one or more physiological parameters, and transmit the indication of the activation of the patient indicator. The origination location can include at least one of a location of a physiological sensor, a patient monitoring device, a patient, a patient room, or one of the plurality of speakers. The adjusted auditory signals can include at least one alarm signal and at least one time-delay alarm signal.

The system of any of the preceding paragraphs may also include any combination of the following features described in this paragraph, among others described herein. The plurality of speakers can include a first speaker and a second speaker. The first speaker can be configured to output the at least one audible noise, such as an alarm signal, and the second speaker can be configured to output the at least one time-delayed audible noise. The at least one time-delayed alarm signal can be a time-delayed copy of the alarm signal. The at least one time-delayed alarm signal can be time-delayed from the alarm signal by a few milliseconds. The plurality of speakers can be located in a patient room. The first speaker can be located closer to the origination location than the second speaker is. The alarm signal can include a heartbeat signal corresponding to a patient's heartbeat.

The present disclosure also provides for an improved monitoring device for adjusting auditory settings based on acoustics of the environment. The patient monitoring device includes a plurality of speakers configured to output auditory signals, a noise sensor, and an acoustics controller having a processor. The processor can be configured to control the plurality of speakers to output one or more test auditory signals, receive noise data from the noise sensor corresponding to the one or more test auditory signals, determine acoustics of a surrounding environment based at least in part on the received noise data, and adjust one or more speaker parameters of the plurality of speakers based on the determined acoustics.

The device of the preceding paragraph may also include any combination of the following features described in this paragraph, among others described herein. The plurality of speakers can include a first speaker and a second speaker. The adjustment of the one or more speaker parameters can optimize the output auditory signals for the determined acoustics of the surrounding environment.

A system is configured to connect to a plurality of devices, each device having one or more speakers. The system can transmit a request to each of the plurality of devices. The request can request that each of the devices provide a test sound through the respective speakers. The system can listen for the test sound of the speakers and can determine at least one of a location, distance, and volume of each of the speakers. The patient monitoring system can use at least one of the plurality of speakers to provide a one or more audible noises. In some cases, the system communicates with each of the devices in sequence. In some cases, the system communicates with each of the devices simultaneously.

The present disclosure also provides for dynamically controlling speaker settings in a medical environment. This can include determining, using a noise sensor, volume settings corresponding to a speaker of an electrical device. Dynamically controlling speaker settings can further include monitoring, using a noise sensor, a level of ambient noise corresponding to a room of a patient, and controlling the volume settings of the speaker to adjust a sound level output of a speaker based at least in part on a determination that one or more volume adjustment conditions are satisfied.

The dynamically controlling speaker settings of the preceding paragraph may also include any combination of the following features or steps described in this paragraph, among others described herein. The one or more volume adjustment conditions can include determining, based on the level of ambient noise, that the patient, the room of the patient, or the speaker is located in a quiet zone of a hospital, and determining, based at least in part on a time of day, that quiet hours are ongoing. The dynamically controlling speaker settings can further include adjusting the sound level output of the speaker to reduce the sound level output of the speaker.

The dynamically controlling speaker settings of any of the preceding two paragraphs may also include any combination of the following features or steps described in this paragraph, among others described herein. The one or more volume adjustment conditions can include determining, based on the level of ambient noise, that the patient, the room of the patient, or the speaker is not located in a quiet zone of a hospital, and determining, based at least in part on a time of day, that quiet hours are not ongoing. The dynamically controlling speaker settings can further include adjusting the sound level output of the speaker to increase the sound level output of the speaker.

The dynamically controlling speaker settings of any of the preceding three paragraphs may also include any combination of the following features or steps described in this paragraph, among others described herein. The noise sensor can include at least one of a decibel reader or a microphone. The level of ambient noise can correspond to the level of ambient noise in a room of a patient. The method can further include adjusting the volume settings of the speaker by a predetermined amount. The method can further include adjusting the volume settings of the speaker to a predetermined volume setting.

The present disclosure also provides for dynamically controlling display settings in a medical environment. This can include determining display settings corresponding to a display. Dynamically controlling display settings can further include monitoring, using an ambient light sensor, a level of ambient light corresponding to a surrounding environment, and adjusting the display settings of the display based on a display settings threshold.

The dynamically controlling display settings of the preceding paragraph may also include any combination of the following features or steps described in this paragraph, among others described herein. Dynamically controlling display settings can further include determining the display settings threshold based on the level of ambient light, and adjusting the display settings based at least in part on a comparison of the display settings to a display settings threshold.

In some aspects of the present disclosure, a method of audibly altering parameters of a medical device can include receiving, using a microphone, a first vocal command, and interpreting the first vocal command as an activation phrase configured to initiate a process of audibly altering parameters of a medical device. The method can further include controlling a speaker to provide an audible indication of an acknowledgment of the activation phrase and initiation of the process of audibly altering parameters of the medical device. The method can further include, after controlling the speaker to provide the audible indication, receiving, using the microphone, a second vocal command. The method can further include interpreting the second vocal command as a request to alter the parameters of the medical device, and causing a display to display, in text, an indication of the interpreted request to alter the parameters. The indication can include a request for confirmation. The method can further include receiving the confirmation and altering the parameters of the medical device.

The method of the preceding paragraph may also include any combination of the following features or steps described in this paragraph, among others described herein. The method can further include receiving a third vocal command, failing to interpret the third vocal command, and controlling the speaker to provide an audible indication that the third vocal command was not interpreted. The confirmation can be received using the microphone. The confirmation can be received using an input device. The input device can include a touch screen or keyboard.

A patient monitoring system can include a speaker. The speaker can include a large speaker chamber. Based on the size of the speaker chamber, the speaker can produce a low-frequency sound that can travel further than convention patient monitoring speakers produce, without having a higher volume. The low-frequency speaker can be configured to pass through walls or doors to alert care providers outside of a room to an activation of the patient indicator.

For purposes of summarizing the disclosure, certain aspects, advantages and novel features are discussed herein. It is to be understood that not necessarily all such aspects, advantages or features will be embodied in any particular embodiment of the invention and an artisan would recognize from the disclosure herein a myriad of combinations of such aspects, advantages or features.

BRIEF DESCRIPTION OF THE DRAWINGS

The following drawings and the associated descriptions are provided to illustrate embodiments of the present disclosure and do not limit the scope of the claims.

FIGS. 5A-5C illustrate example localized sound projection systems for providing localized projection of audible noises.

While the foregoing "Brief Description of the Drawings" references generally various embodiments of the disclosure, an artisan will recognize from the disclosure herein that such embodiments are not mutually exclusive. Rather, the artisan would recognize a myriad of combinations of some or all of such embodiments.

DETAILED DESCRIPTION

Figure 1:
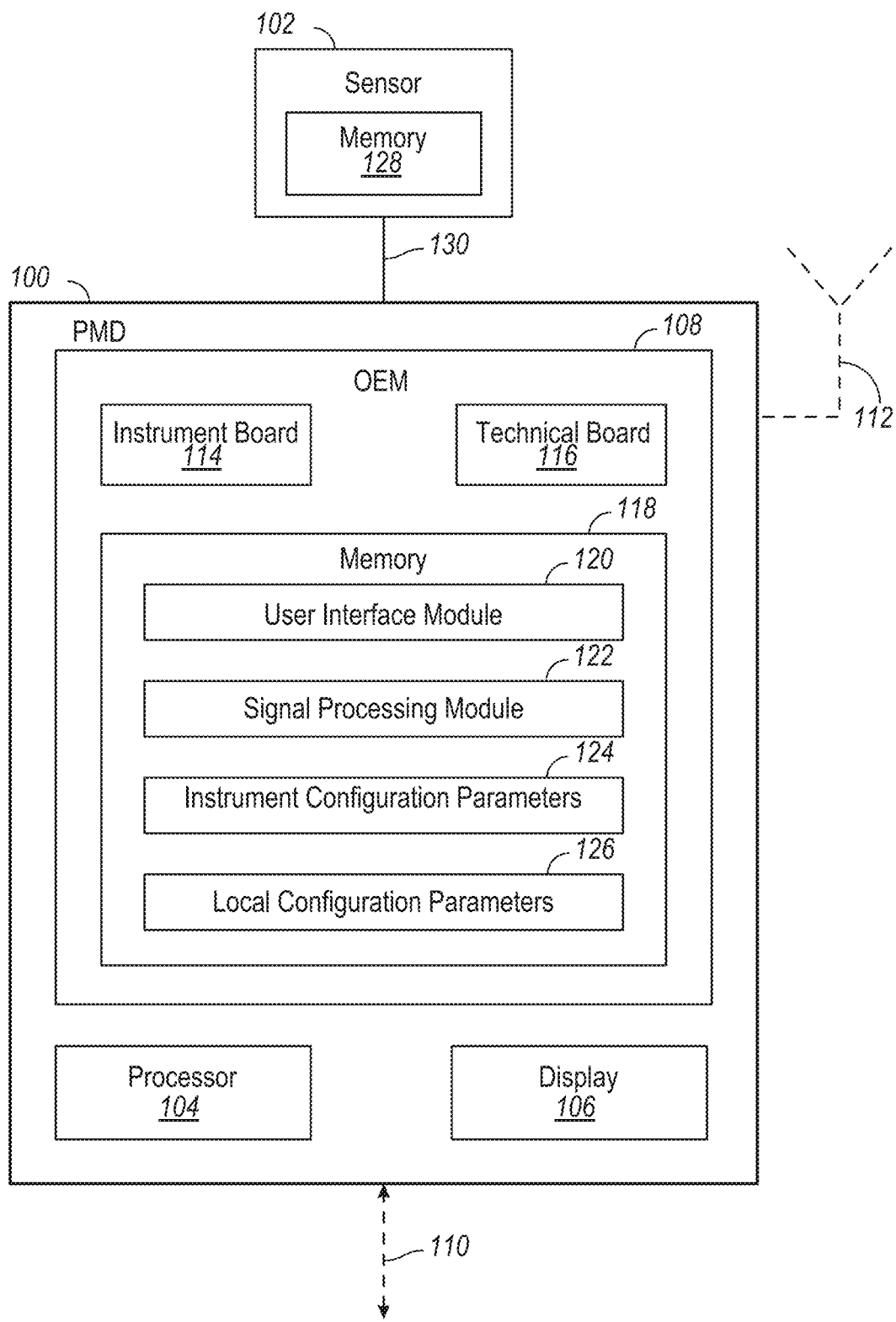
FIG. 1 is an example block diagram of a patient monitoring device.

FIG. 1 is an example block diagram of a patient monitoring device. The patient monitoring device can include a docked portable patient monitor 100, which may be referred to herein as the patient monitoring device 100. The patient monitoring device 100 may advantageously include an oximeter, co-oximeter, respiratory monitor, depth of sedation monitor, noninvasive blood pressure monitor, vital signs monitor or the like, such as those commercially available from Masimo Corporation of Irvine, CA, and/or disclosed in U.S. Patent Publication Nos. 2002/0140675, 2010/0274099, 2011/0213273, 2012/0226117, 2010/0030040; U.S. Patent Application Ser. Nos. 61/242,792, 61/387,457, 61/645,570, Ser. No. 13/554,908 and U.S. Pat. Nos. 6,157,850, 6,334,065, and the like.

The patient monitoring device 100 can include a first processor 104, a display, 106, and an OEM board 108. The patient monitoring device 100 further includes one or more cables 110 and an antenna 112 for wired and wireless communication, respectively.

The OEM board 108 can include an instrument board 114, a core or technical board 116, and memory 118. In some cases, the memory 118 can include a user interface module 120, a signal processing module 122, instrument configuration parameters 124, and local configuration parameters 126.

The patient monitoring device 100 may communicate with a variety of noninvasive and/or minimally invasive sensors 102 such as optical sensors with light emission and detection circuitry, acoustic sensors, devices that measure blood parameters from a finger prick, cuffs, ventilators, ECG sensors, pulse oximeters, and the like.

One or more of the sensors 102 can be attached to a medical patient. The sensors 102 can obtain physiological information from a medical patient and transmit this information to the technical board 116 through cables 130 or through a wireless connection (not shown). The physiological information can include one or more physiological parameters or values and waveforms corresponding to the physiological parameters.

The technical board 116 can receive physiological information from the sensors 102. The technical board 116 can include a circuit having a second processor, which may be the same as the first processor 104, and input ports for receiving the physiological information. The technical board 116 can access the signal processing module 122 to process the physiological information in the second processor. In addition, the technical board 116 can include one or more output ports, such as serial ports. For example, an RS232, RS423, or autobaud RS232 (serial interface standard) port or a universal serial bus (USB) port may be included in the technical board 116.

The technical board 116 and the signal processing module 122 can include a sensor processing system for the patient monitoring device 100. In some cases, the sensor processing system generates waveforms from signals received from the sensors 102. The sensor processing system may also analyze single or multiparameter trends to provide early warning alerts to clinicians prior to an alarm event. In addition, the sensor processing system can generate alarms in response to physiological parameters exceeding certain safe thresholds.

Example alerts include no communication with the patient monitoring device 100, alarm silenced on the patient monitoring device 100, instrument low battery (patient monitoring device 100), and transmitter low battery. Example physiological parameters include $SpO_2$ levels, high and low $SpO_2$, high and low PR, HbCO level, HbMET level, pulse rate, perfusion index, signal quality, HbCO, HbMET, PI, and desat index. Additional example alarms include $SpO_2$ alarms, high and low $SpO_2$ alarms, high and low PR, HbCO alarms, HbMET alarms, pulse rate alarms, no sensor alarms, sensor off patient alarms, sensor error, low perfusion index alarm, low signal quality alarm, HbCO alarm, HbMET alarm, PI trend alarm, and desat index alarm.

The instrument board 114 can receive the waveforms, alerts, alarms, and the like from the technical board 116. The instrument board 114 can include a circuit having a third processor, which may be the same as the first processor 104, and input ports for receiving the waveforms, alerts, and alarms from the technical board 116 and output ports for interfacing with the display 106, a speaker or other device capable of producing an audible indication. The instrument board 114 can access the user interface module 120 to process the waveforms, alerts, and alarms to provide indications of the waveforms, alerts, alarms or other data associated with the physiological parameters monitored by the sensors 102. The indications can be displayed on the display 106. In addition or alternatively, the alerts and alarms are audible. The indications, alerts, and alarms can be communicated to end-user devices, for example, through a hospital backbone, a hospital WLAN 16, and/or the Internet.

Additionally, the instrument board 114 and/or the technical board 116 may advantageously include one or more processors and controllers, busses, all manner of communication connectivity and electronics, memory, memory readers including EPROM readers, and other electronics recognizable to an artisan from the disclosure herein. Each board can include substrates for positioning and support, interconnect for communications, electronic components including controllers, logic devices, hardware/software combinations and the like to accomplish the tasks designated above and others.

An artisan will recognize from the disclosure herein that the instrument board 114 and/or the technical board 116 may include a large number of electronic components organized in a large number of ways.

Because of the versatility needed to process many different physiological parameters, the technical board 116 can further include a revision number or other indication of the circuit design and capabilities of a specific technical board 116.

Likewise, because of the versatility needed to display the processed physiological parameters for use by many different end users, the instrument board 114 can further include a revision number or other indication of the circuit design and capabilities of the specific instrument board.

Software is also subject to upgrading to increase its capabilities. The signal processing module 122 can further include a version number or other indication of the code found in the specific signal processing module 122. Likewise, the user interface module 120 can further include a version number or other indication of the code found on the specific user interface module 120.

Some or all of the serial numbers, the model numbers, and the revision numbers of the technical board 116 and the instrument board 114 that include the specific patient monitoring device 100 can be stored in the instrument configuration parameters 124. Further, the version numbers of the signal processing module 122 and the user interface module 120 are stored in the instrument configuration parameters 124. The instrument configuration parameters 124 can further include indications of the physiological parameters that are enabled, and indications of the physiological parameters that are capable of being enabled for the patient monitoring device 100.

The location of the patient monitoring device 100 can affect the sensitivity at which a physiological parameter is monitored. For example, a physiological parameter may be monitored with greater sensitivity when the patent monitoring device 100 is located in the neonatal intensive care unit (NICU), OR or surgical ICU than when it is located in an adult patient's room. In some cases, the location of the patient monitoring device 100 may affect the availability of the device for another patient. For example, a patient monitoring device 100 located in the hospital discharge area may be available for another patient, whereas one located in a patient's room may not be available anytime soon.

The local configuration parameters 126 can include a location of the patient monitoring device 100 within the facility, an indication of whether the device is configured for adult or pediatric monitoring, and the like.

The sensor 102 can include memory 128. The memory 128 can include information associated with the sensor 102, such as, but not limited to a sensor type, a sensor model number, a sensor revision number, a sensor serial number, and the like.

The patient monitoring device 100 can include a Radical-7® Rainbow SET Pulse Oximeter by Masimo Corporation, Irvine, CA. The OEM board 108 can be produced by Masimo Corporation, Irvine, CA and used by others to produce patient monitoring devices.

Figure 2A:
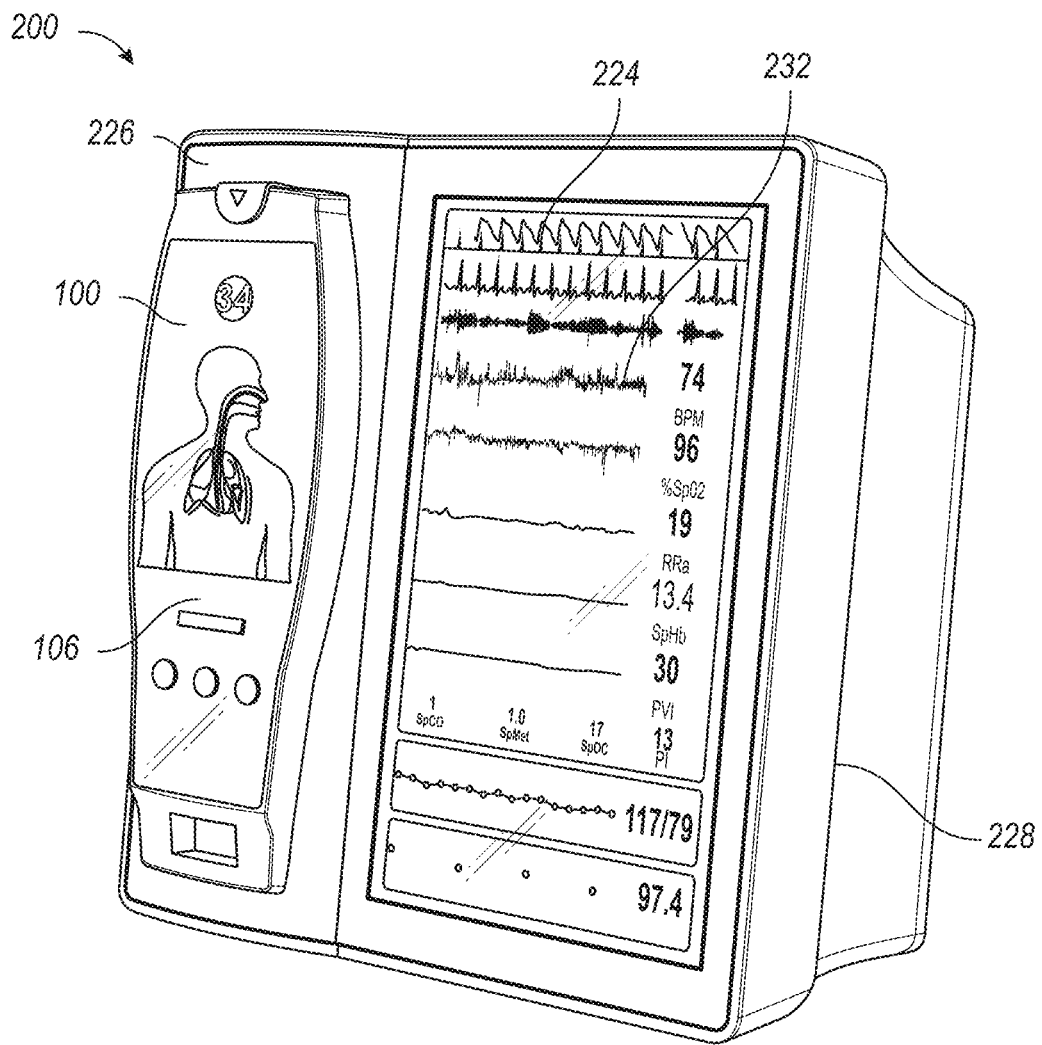
FIG. 2A is a perspective view of an example patient monitoring device including a hub and the patient monitoring device of FIG. 1.

FIG. 2A illustrates a perspective view of an example patient monitoring device, such as a medical monitoring hub with the docked portable patient monitoring device 100, the combination of which may also be referred to herein as a patient monitoring device or patient monitoring system 200. The hub includes a display 224, and a docking station 226, which can be configured to mechanically and electrically mate with the portable patient monitoring device 100, each housed in a movable, mountable and portable housing 228. The housing 228 includes a generally upright inclined shape configured to rest on a horizontal flat surface, although the housing 228 can be affixed in a wide variety of positions and mountings and include a wide variety of shapes and sizes.

The display 224 may present a wide variety of measurement and/or treatment data in numerical, graphical, waveform, or other display indicia 232. The display 224 can occupy much of a front face of the housing 228; although an artisan will appreciate the display 224 may include a tablet or tabletop horizontal configuration, a laptop-like configuration or the like. Other examples may include communicating display information and data to a table computer, smartphone, television, or any display system recognizable to an artisan. The upright inclined configuration of FIG. 2A presents display information to a caregiver in an easily viewable manner. The patient monitoring device 200 may display information for a variety of physiological parameters, such as but not limited to oxygen saturation (SpO2), hemoglobin (Hb), oxyhemoglobin (HbO2), total hemoglobin, carboxyhemoglobin, methemoglobin, perfusion index (Pi), pulse rate (PR) of blood pressure, temperature, electrocardiogram (ECG), motion data, accelerometer data, respiration, continuous blood pressure, pleth variability index, oxygen content, oxygen reserve index, acoustic respiration rate (RRa), and respiration rate from the pleth.

Figure 2B:
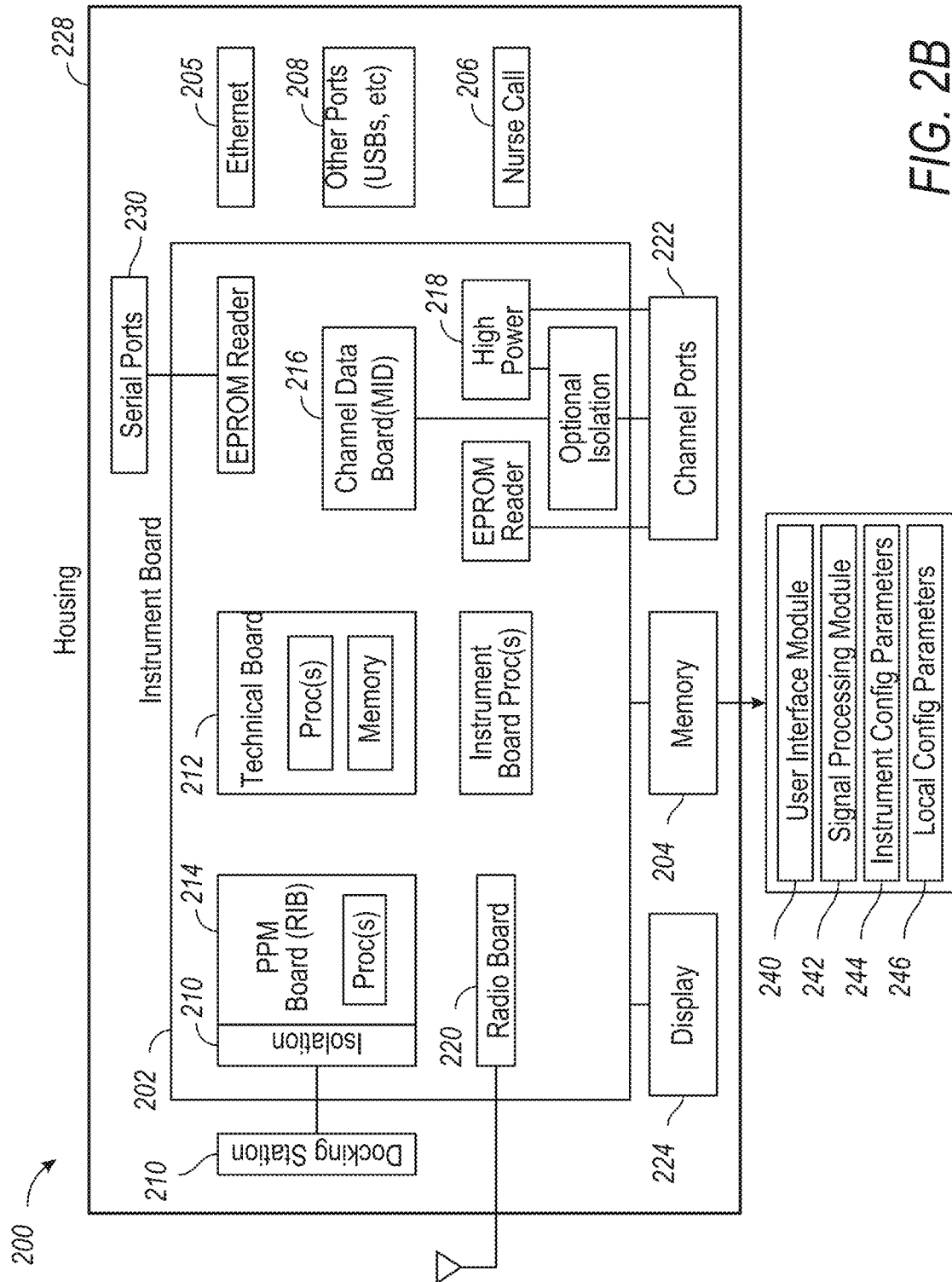
FIG. 2B illustrates an example hardware block diagram of the hub of FIG. 2B.

FIG. 2B illustrates a simplified example hardware block diagram of the patient monitoring device 200. As shown in FIG. 2B, the housing 228 of the patient monitoring device 200 positions and/or encompasses an instrument board 202, a core or technical board 212, the display 224, memory 204, and the various communication connections, including serial ports 230, channel ports 222, Ethernet ports 205, nurse call port 206, other communication ports 208 including standard USB, or the like, and a docking station interface 210. The instrument board 202 can include one or more substrates including communication interconnects, wiring, ports and the like to enable the communications and functions described herein, including inter-board communications. The technical board 212 includes the main parameter, signal, and other processor(s) and memory. A portable monitor board ("RIB") 214 includes patient electrical isolation for the monitor 100 and one or more processors. A channel board ("MID") 216 controls the communication with the channel ports 222 including optional patient electrical isolation and power supply 218, and a radio board 220 includes components configured for wireless communications.

Additionally, the instrument board 202 and/or the technical board 212 may advantageously include one or more processors and controllers, busses, all manner of communication connectivity and electronics, memory, memory readers including EPROM readers, and other electronics recognizable to an artisan from the disclosure herein. Each board can include substrates for positioning and support, interconnect for communications, electronic components including controllers, logic devices, hardware/software combinations and the like to accomplish the tasks designated above and others.

An artisan will recognize from the disclosure herein that the instrument board 202 and or the technical board 212 may include a large number of electronic components organized in a large number of ways.

Because of the versatility needed to process many different physiological parameters, the technical board 212 can further include a revision number or other indication of the circuit design and capabilities of a specific technical board 212.

Likewise, because of the versatility needed to display the processed physiological parameters for use by many different end users, the instrument board 202 can further include a revision number or other indication of the circuit design and capabilities of the specific instrument board 202.

The memory 204 can include a user interface module 240, a signal processing module 242, instrument configuration parameters 244, and local configuration parameters 246.

The instrument board 202 can access the user interface module 240 to process the waveforms, alerts, and alarms to provide indications of the waveforms, alerts, alarms or other data associated with the physiological parameters for the patient monitoring device 200. The technical board 212 can access the signal processing module 242 to process the physiological information for the patient monitoring device 200.

Software for the patient monitoring device 200 is also subject to upgrading to increase its capabilities. The signal processing module 242 can further include a version number or other indication of the code found in the specific signal processing module 242. Likewise, the user interface module 240 can further include a version number or other indication of the code found on the specific user interface module 240.

Some or all of the serial numbers, the model numbers, and the revision numbers of the technical board 212 and the instrument board 202 that include the specific patient medical monitoring hub 150 can be stored in the instrument configuration parameters 244. Further, the version numbers of the signal processing module 242 and the user interface module 240 can be stored in the instrument configuration parameters 244. The instrument configuration parameters 244 further include indications of the physiological parameters that are enabled, and indications of the physiological parameters that are capable of being enabled for the patient monitoring device 200.

The local configuration parameters 246 can include a location of the patient monitoring device 200 within the facility, an indication of whether the device is configured for adult or pediatric monitoring, and the like.

The patient monitoring device 200 can include a Root® Patient Monitoring and Connectivity Platform by Masimo Corporation, Irvine, CA that includes the Radical-7® also by Masimo Corporation, Irvine, CA.

Figure 3:
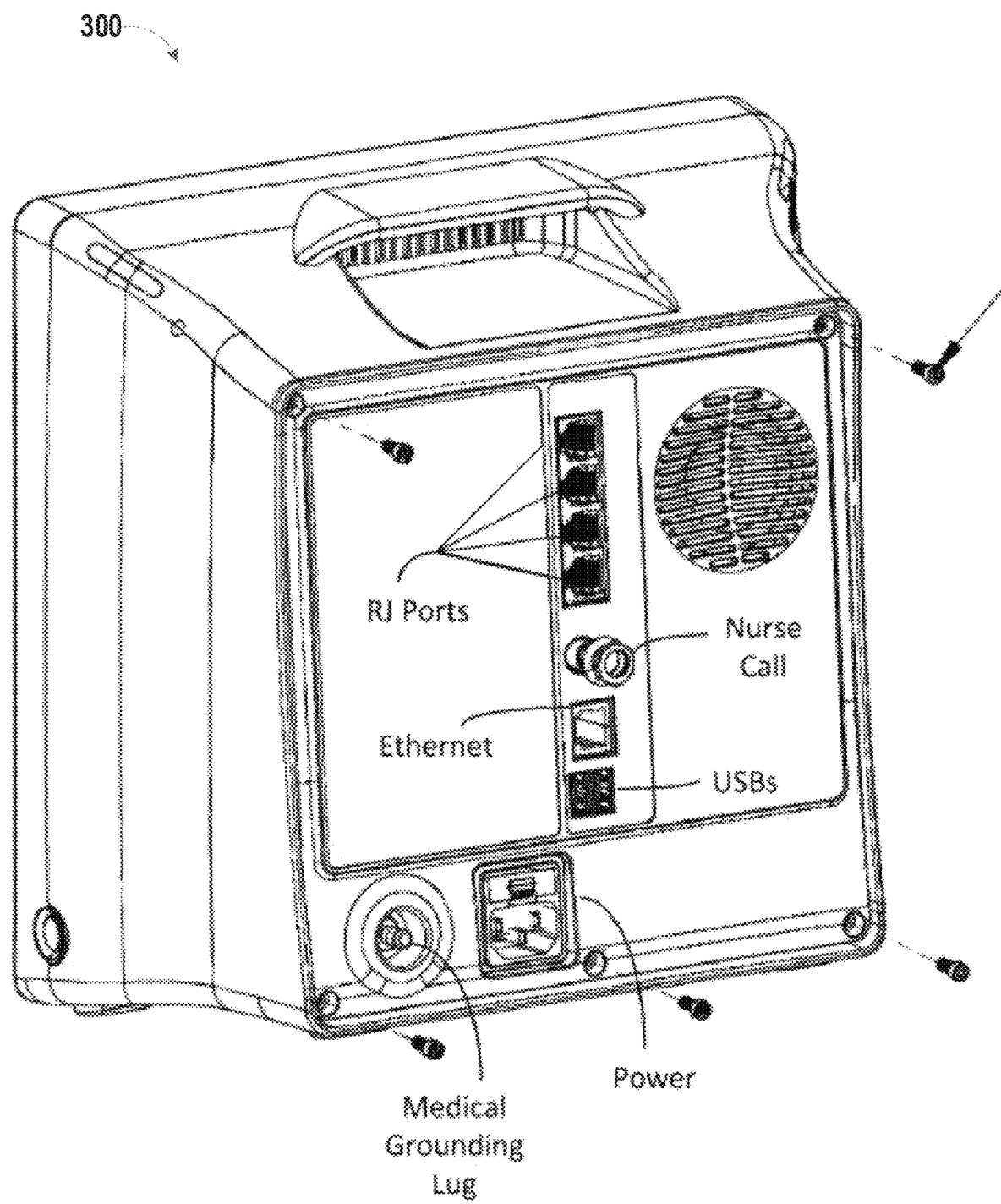
FIG. 3 illustrates a perspective view of a back side of the patient monitoring device of FIG. 2A.

FIG. 3 illustrates an example perspective view of a back side of the patient monitoring device 200 of FIG. 2A, showing an example serial data inputs. The inputs can include RJ 45 ports. As is understood in the art, these ports include data ports similar to those found on computers, network routers, switches and hubs. A plurality of these ports can be used to associate data from various devices with the specific patient identified in the patient monitoring device 200. FIG. 2B also shows a speaker, the nurse call connector, the Ethernet connector, the USBs, a power connector and a medical grounding lug.

Low-Frequency Speaker

Figure 4:
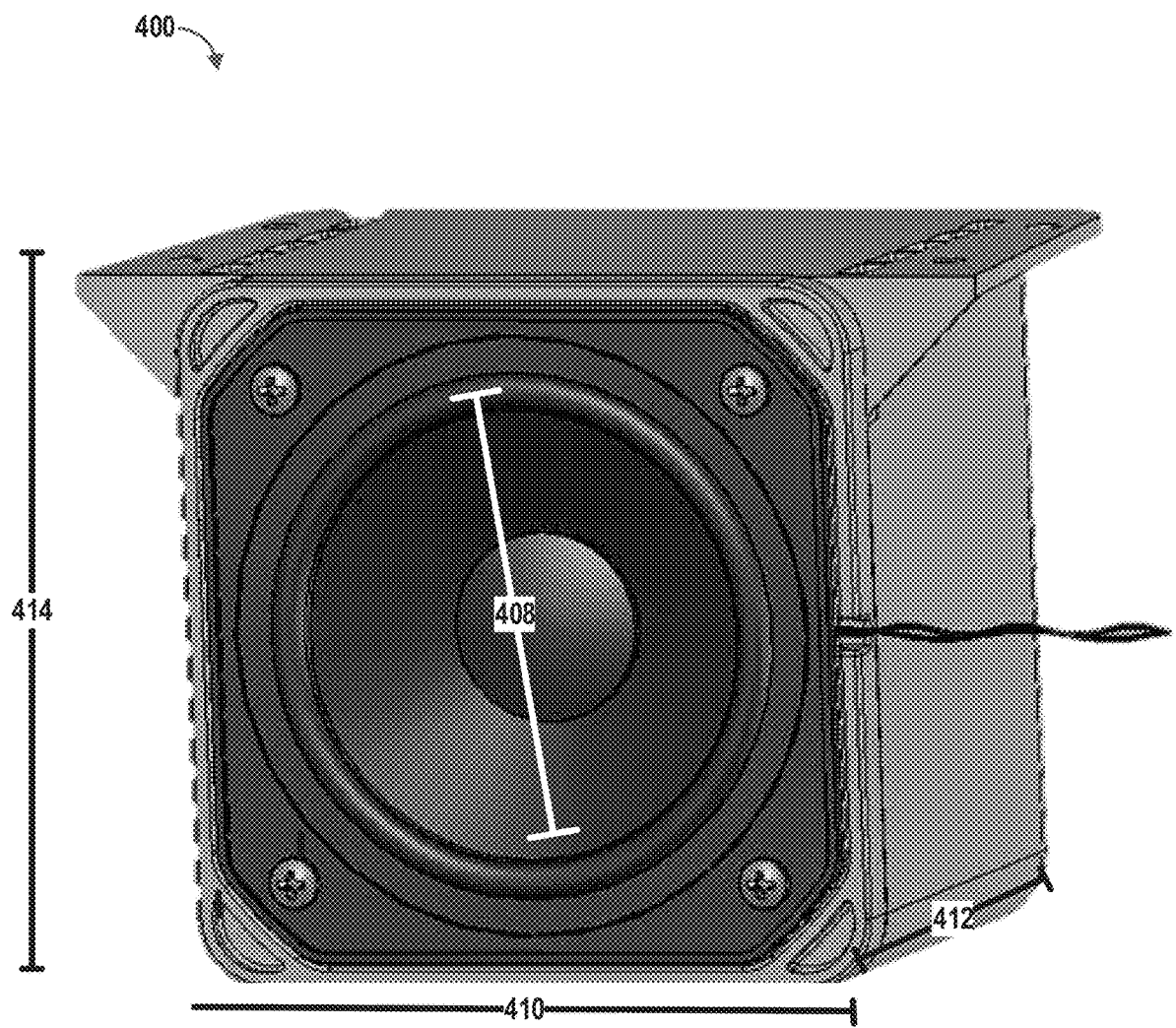
FIG. 4 is illustrates an example speaker for producing an audible noise.

FIG. 4 is illustrates an example speaker 400 that can be incorporated into or in communication with a patient monitoring device and can produce one or more audible noises. Advantageously, the speaker 400 can produce a sound wave that can travel further and sound differently than conventional speakers, thereby increasing a likelihood that a caregiver can hear, and ultimately respond to, the audible noise.

As described here, a patient monitoring device can be configured to receive one or more signals from a physiological sensor, determine one or more measurements of the one or more physiological parameters of a patient from the received signal, and determine one or more conditions associated with the one or more measurements of the one or more physiological parameters. The patient monitoring device can communicate with speaker 400 and cause the speaker to produce an audible noise, which can include an alarm or other sound, such as a heat beat, a chirp or any other noise meant to obtain the attention of the care provider in an intuitive way. In some cases, the audible noise can be intended to alert a caregiver of an alarm condition or of the activation of the patient indicator. Accordingly, it can be of vital importance to the health of the patient for a caregiver to hear and respond to the audible noise of the speaker 400.

Unfortunately, especially in a hospital environment when nurses and doctors are responsible for a multitude of patients, it can be difficult to provide an audible noise that can be heard by a caregiver, who might be a substantial distance from the patient such as outside of the patient's room. One solution might be to make the audible noise louder, but this solution comes with its disadvantages, such as causing damage to a nearby patient's hearing or simply disrupting any serenity provided by the hospital. Speaker 400 can advantageously produce a sound wave that can travel further than conventional speakers can (for example, passing through walls), yet is not louder in volume than conventional speakers are. Accordingly, the speaker 400 can increase a likelihood that an audible noise will be heard by a caregiver.

In contrast to traditional speakers, the speaker 400 has an increased size. For example, any of the, length 410, width 412, height 414, or diameter 408 can larger than that of a traditional speaker. Furthermore, and the speaker includes a large acoustic chamber that allows the speaker 400 to produce sound waves that have lower frequencies. Walls reflect and/or absorb most high and medium frequency sound. The remaining low frequency energy that is not reflected or absorbed passes through the wall. Accordingly, the speaker 400 can produce a low frequency that generally passes through walls.

Localized Projection

Figure 5A:
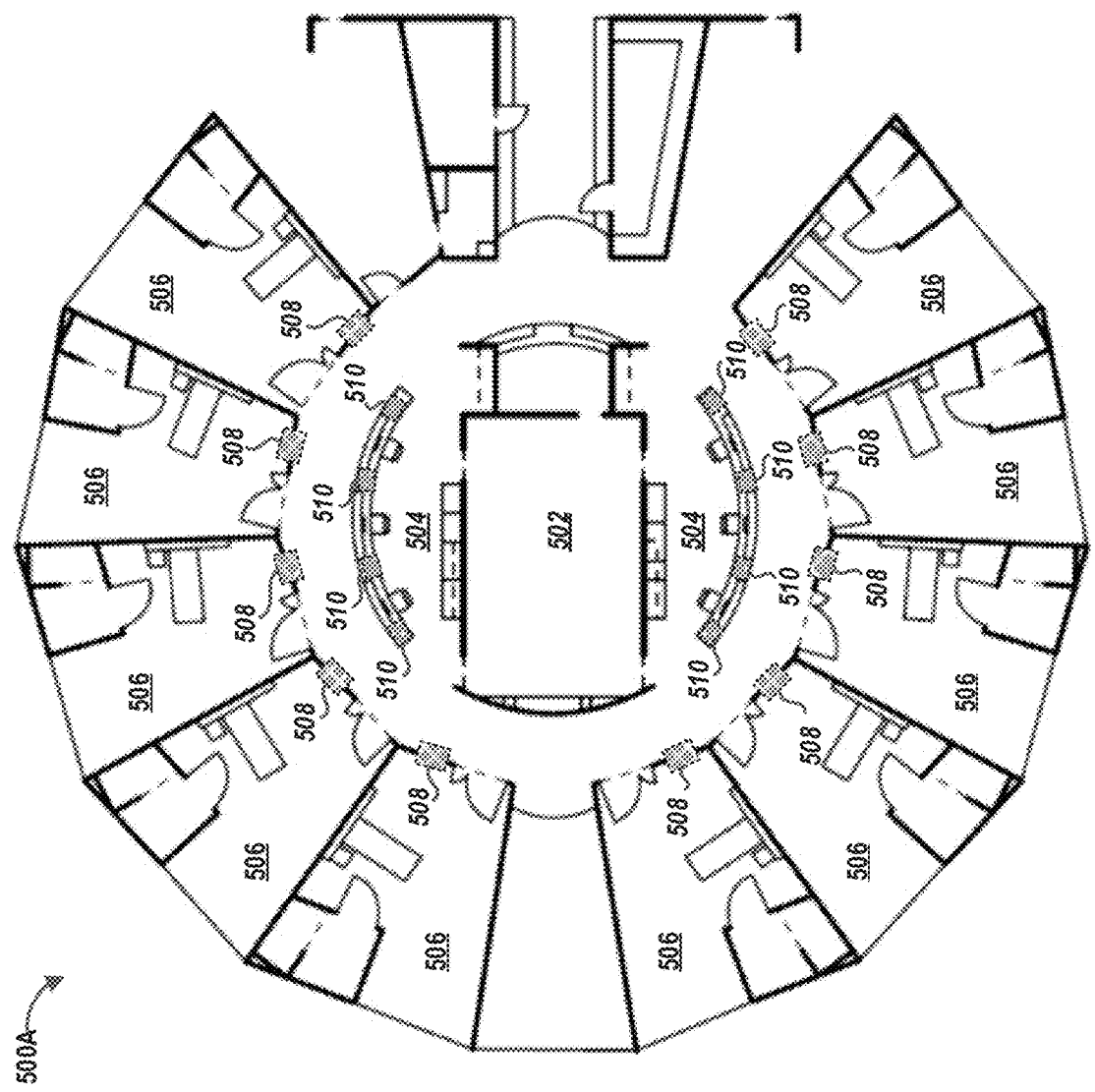

FIGS. 5A-5B illustrate example localized sound projection systems 500A, 500B for providing localized projection of audible noises. The localized sound projection systems 500A, 500B can coordinate the audible noises of various speakers to simulate the placement of an auditory cue in a three dimensional space. In other words, systems 500A, 500B adjust sound parameters to fool a listener's brain into thinking an audible noise originates from a particular location. This provides the advantage of intuitively directing a care provider's attention to a location that can aid the care provider in caring for the patient.

As illustrated in FIG. 5A, the localized sound projection system 500A can be implemented on a floor of a medical facility to aid caregivers in effectively monitoring their patients. The floor has a generally circular layout, which advantageously provides a functional flow that benefits both the patients and the staff. Patient rooms 506 can be located around the exterior of the floor and the nurses' stations 504 can be centrally located on the floor to minimize a distance between a nurse and any particular patient's room 506.

To aid in monitoring the patients, in many cases, the nurses' desks are oriented in a nursing station 504 such that the nurses' backs are to each other or to a supply room 502 and their faces are directed to the patients' rooms 506. Each of the nurses at the nurses station can be assigned a set of patients, and, in many circumstances, this assignment can be based on the patient room locations on the floor. For example, with four nurses working the floor and two at each nursing station 504, each of the nurses can be assigned a quarter of the floor. Accordingly, a particular nurse is responsible for any patient residing in a patient room 506 that corresponds to the assigned quarter of the floor.

However, despite these provisions, in many cases, each nurse is generally responsible for monitoring many patients at once. Further, many physiological parameters including heart rate, blood pressure, or the like can be monitored for each patient. Thus, a nurse's job can be quite overwhelming and complex, especially when he or she is hearing many audible noises at once, as it can be sometimes be difficult for the nurse to determine which audible noise corresponds to a particular patient. Accordingly, techniques for enhancing patient monitoring are described.

The localized sound projection systems 500A, 500B can implement sound localization techniques. Sound localization exploits a listener's spatial-hearing "map," a perceptual representation of where sounds are located relative to the head. Generally, listeners can hear a sound and can identify the position of the sound or discriminate changes in the location of sounds. By coordinating or offsetting speakers, the localized sound projection systems 500A, 500B can simulate the placement of an auditory cue in a 3D space. In other words, the localized sound projection systems 500A, 500B can, in essence, fool the listener's brain into thinking an audible noise originates from a particular location, such as a patient's room, a patient, a particular area in the nurses' station 504, etc.

The localized sound projection system 500A, 500B can adjust a location (sometimes referred to as origination location) at which a listener thinks the audible noise originated in order to give the listener immediate insight as to a direction from which the issue arises. For example, if a patient indicator is activated for Patient A, localized sound projection system 500A, 500B can cause an audible noise to sound as if it is coming from Patient A's room. Accordingly, the localized sound projection system can advantageously aid a caregiver in identifying the direction or location of a patient that necessities attention, which can speed up a caregiver response time.

A person's auditory system uses several cues for sound source localization, including time- and level-differences (or intensity-difference) between ears, spectral information, timing analysis, correlation analysis, and pattern matching. Thus, system 500A can include a plurality of speakers that are located at various positions in a space. For example, any of speakers 508, 510 can be located on a hospital floor, a nursing station, or a patient's room. The speakers can be configured to simulate the placement of an auditory noise, which may be an alarm or a sound, such as a heat beat, a chirp or any other noise meant to obtain the attention of the care provider in an intuitive way by altering one or more of a timing, intensity, frequency, etc. of a sound signal output by the speakers. For example, the timing can be altered by a few milliseconds.

By altering a timing, intensity, frequency or one or more of the speakers, the system 500A, 500B can simulate audible noises as originating from various locations, thereby making the listener believe the sounds are coming from the simulated location.

As a non-limiting example, each patient room 506 can include one or more patient monitors that are configured to monitor physiological parameters of a patient. The system 500A can communicate with patient monitors in a plurality of patient rooms 506 (or can communicate with a centralized system that communicates with the patient monitors). When a patient indicator is activated for a particular patient, the system 500A can coordinate the audible noises of the speakers to make them sound as if they are originating from a particular location or direction, such as a patient, a patient's bed, a patient's room, or a general direction of a patient.

The system can utilize multiple speakers projecting audible noises at different delays. For example, the system can utilize speakers, and based on the activation of the patient indicator, the second speaker can project an audible noise that is delayed by a few milliseconds relative to an audible noise projected by another speaker. Accordingly, the system can fool a user's brain into thinking the audible noise is coming from a particular direction, such as a location of a patient's room or a specific location on the patient. For example, the system can fool a user's brain into thinking that the audible noise is coming from the patient's foot.

FIG. 5B illustrates a system 500B that includes a plurality of speakers 520 and 522 that are configured to output audible noises. In some cases, the system 500B can include fewer or more speakers. For example, the system 500B can include 1, 3, 4, 5, 6, 7, 8 or more speakers. Furthermore, although the speakers are generally aligned around the patient monitor 200, any one or more of the speakers 520, 522 can be aligned in any suitable manner throughout the patient room. Thus, the placement of the speakers illustrated in FIG. 5B should not be construed as limiting.

The system 500A, 500B can utilize a speaker of one or more various connected devices to provide surround sound. For example, the system 500A, 500B can be in communication with various devices (for example, patient monitors, televisions, etc.) that have an associated speaker. The system 500A, 500B, 500C can also utilize a sound calibration mode to determine which of these connected devices have sound capabilities. Furthermore, the system 500A and 500B can determine a location of each of the various devices and/or can determine from which direction or location the sounds will come from.

For example, the system 500A, 500B, 500C can transmit a command to one or more of the connected devices and request that the device make a sound. The patient monitoring system can then use a noise sensor to monitor the sound and determine the direction, location, volume, etc. of the particular device. After acquiring this information for a plurality of devices, the system 500B can then use the speakers of those devices to provide localized projection of patient sounds. Because the various connected devices may by moved around the room, removed from the room, or added to the room, the patient monitoring system may periodically initiate the sound calibration mode to reset the localized projection.

As described herein with respect to FIG. 5A, the system 500B can utilize one or more of the speakers 520, 522 to output an audible noise to simulate the audible noise as originating from various locations.

An abnormal parameter or system operating parameter can be associated with a specific portion of a patient's body. For instance, if the system utilizes a pulse oximeter, then a probe off condition might be associated with a patient's left or right hand. Similarly, a patient's respiration rate might be associated with a patient's chest. Accordingly, in some cases, when the system wants to indicate an audible noise, it can utilize a speaker or speakers that is closest to the associated portion of the patient's body or can project audible noises using a plurality of speakers in a particular direction. Using the examples above, the system can utilize the speakers on the right side of the patient's body to indicate a probe off condition corresponding to the patient's right hand. Similarly, the system can utilize the speakers near the patient's head to indicate the activation of the patient indicator associated with the upper half of a patient's body. For example, the patient indicator associated with the upper half of the patient's body can include an abnormal respiration rate. Accordingly, the system can utilize the speakers to indicate to the caregiver a direction and/or general location of the portion of the patient's body which needs attention. Alternatively, a surround sound bar can be used to project sound in a specific direction to draw the attention of care providers in that direction.

The system can be utilized to localize the projection of an audible noise to make the audible noise sound as though it is coming from an ailing body part or a portion of the patient's body that is associated with the activation of the patient indicator. By localizing the sound to a particular portion of the patient's body, a caregiver is quickly informed of the location on the patient which is experiencing an issue and the caregiver can more easily and more efficiently determine what is wrong with the patient. As a non-limiting example, if the patient monitor detects that the patient is experiencing an abnormal heart rate, the surround sound can localize the sound of the audible noise to the patient's heart, such that it sounds as though the audible noise is coming from the patient's heart.

The audible noise or notification can be a sound that corresponds the activation of the patient indicator. For instance, if a heart rate parameter is causing the activation of the patient indicator, then the audible noise can sound like a beating heart. Thus, by hearing the audible noise, and because a heartbeat is an easily identifiable noise, the caregiver will know that the heart rate is abnormal. Similarly, if a patient hydration parameter is causing an audible noise, the audible noise can sound like running or falling water. Different audible noises can be set for each measured parameter, or a single audible noise can be set for any of a group of parameters. It should be noted however that while any audible noise can be used to designate an alarm, it can be advantageous for the audible noise to sound like or correspond to the abnormal parameter so as to help guide the caregiver. Alternatively or in addition, the audible noise can include an audible representation of the abnormal parameter. For instance, "oxygen saturation," "carboxyhemoglobin," "methemoglobin," etc. can be spoken by the speaker when that particular parameter is abnormal.

Figure 5C:
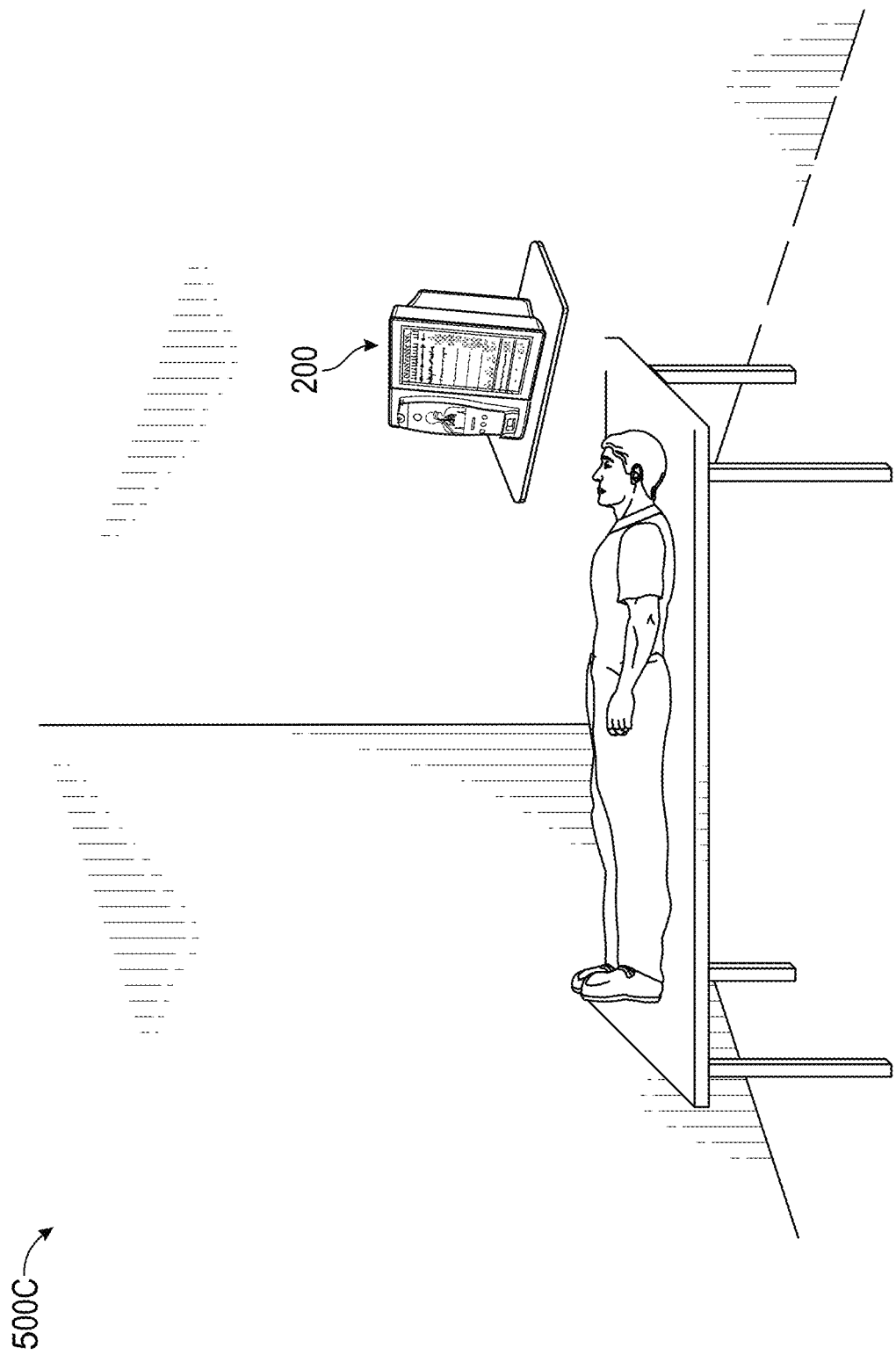

FIG. 5C illustrates a system 500C that includes a patient monitor 200 configured to adjust speaker parameters based on surrounding acoustics. The patient monitoring device 200 can include a plurality of speakers, a noise sensor, and an acoustics controller. Using the speakers, the noise sensor, and the acoustics controller, the patient monitor 200 can transmit and detect a test auditory signal, and based on these signals can determine an acoustics of the surroundings. The patient monitoring device can adjust one or more of the speaker parameters based on the determined acoustics.

The speakers of the patient monitoring device 200 can be integrated within a housing of the device. In some cases, the patient monitor 200 includes two integrated speakers. However, in other cases, the system 500C can include fewer or more speakers. For example, the system 500B can include 1, 3, 4, 5, 6, 7, 8 or more speakers. Each of the speakers can have configurable settings which can be adjusted based off determined acoustics.

The noise sensor can include any of various types of sensors configured to measure noise. For example, the noise sensor can include, but is not limited to, a decibel reader, a microphone, or any other sensor capable of ambient noise detection.

The patient monitoring device 200 can include an acoustics controller that includes a processor. The processor of the acoustics controller can be configured to control the speakers to output test auditory signals. Furthermore, the processor can receive noise data from the noise sensor. The noise data can correspond to the one or more tests signals. Based on the test auditory signals output by the speakers and the noise data received from the noise sensor, the processor can determine an acoustics of a surrounding environment. For example, based on a change in the test signal from when it was transmitted by the speakers two when it was received by the noise sensor, the processor can determine one or more properties or qualities of the environment that determine how sound is transmitted in it. Based on these one or more properties or qualities of the environment, the system can adjust one or more speaker parameters of the speakers. In some cases, the adjustment can optimize speakers for the determined acoustic environment.

Figure 6:
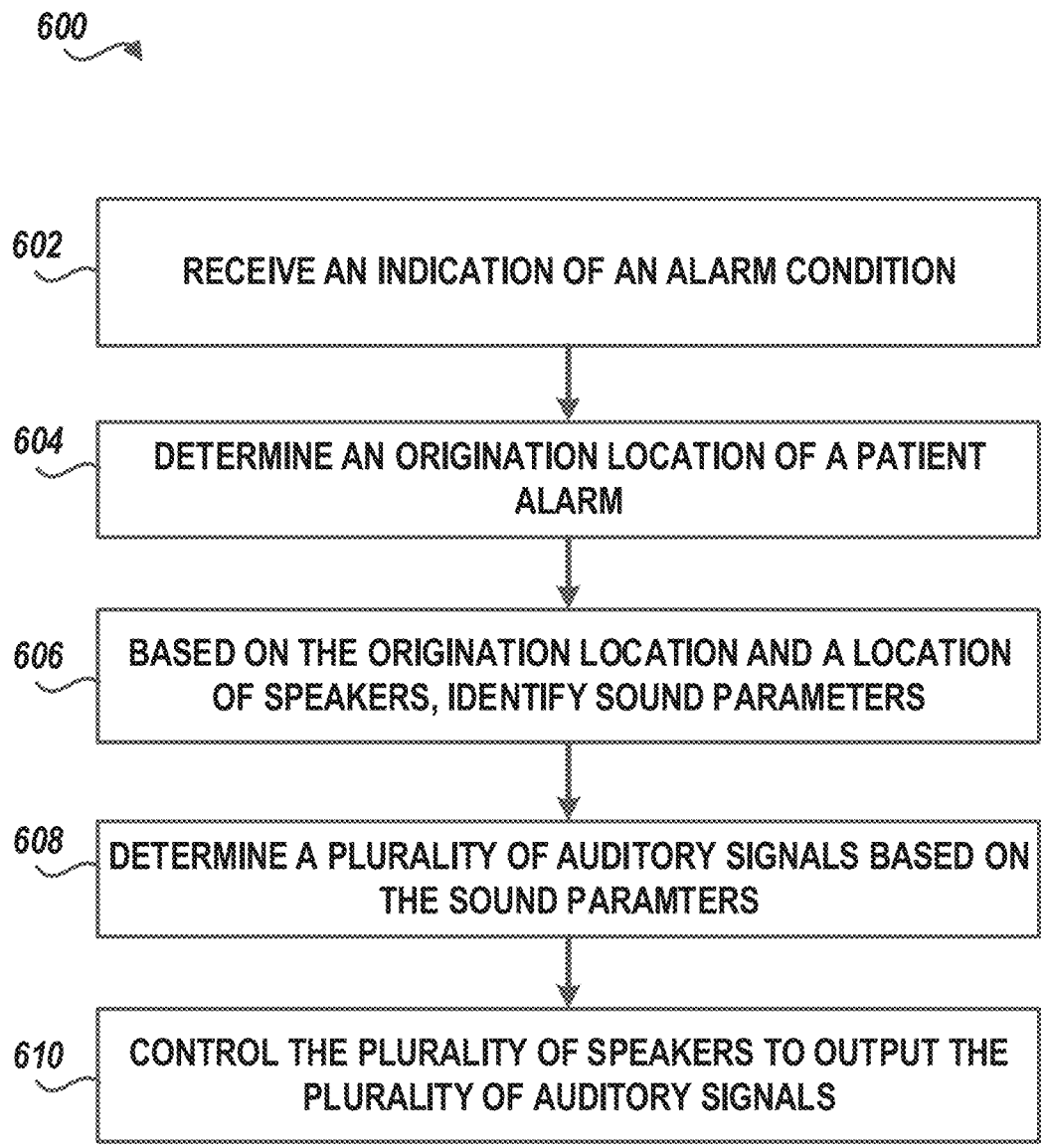
FIG. 6 is a flow diagram illustrative of an embodiment of a routine implemented by a system to provide localized projection of audible noises via a plurality of speakers.

FIG. 6 is a flow diagram illustrative of an embodiment of a routine implemented by the system to provide localized projection of patient sounds via a plurality of speakers. One skilled in the relevant art will appreciate that the elements outlined for routine 600 can be implemented by a computing device such as sound localization controller in communication with a plurality of speakers. In addition or alternatively, routine 600 can be implemented by the patient monitoring device 100 or another computing device in communication with or incorporating the plurality of speakers. Accordingly, routine 600 has been logically associated as being generally performed by sound localization controller. However, the following illustrative embodiment should not be construed as limiting. Furthermore, it will be understood that the various blocks described herein with reference to FIG. 6 can be implemented in a variety of orders. For example, the patient monitoring device 100 can implement some blocks concurrently or change the order as desired. Furthermore, it will be understood that fewer, more, or different blocks can be used as part of the routine 600.

At block 602, the sound localization controller can receive an indication of an activation of the patient indicator. The indication of the activation of the patient indicator can include, but is not limited to indications of waveforms, alerts, alarms or other data associated with physiological parameters of a patient monitoring device (for example, device 100 or 150). As described herein, a patient monitoring device can be communicatively coupled to one or more physiological sensors. The patient monitoring device can receive one or more patient signals from the physiological sensors and can determine measurements of physiological parameters of a patient from the received patient signals. The patient monitoring device can monitor patient indicators associated with the measurements of the physiological parameters. In some cases, the patient monitoring device can transmit the indication of the activation of the patient indicator to the sound localization controller. In addition or alternatively, the sound localization controller can monitor the activation of the patient indicator.

The sound localization controller can be in communication with one or more patient monitors that monitor one or more patients. For example, a patient monitor may be located in a patient's room, and the patient monitor can be configured to monitor the patient residing in the patient room. Other patient monitors can be located in the same room or in other rooms and can monitor the same patient or other patients. The sound localization controller can communicate with one or more of the patient monitors and can receive patient indicators from each of the patient monitors with which it is in communication. In some cases, the indication of the activation of the patient indicator comprises other identifying information such as a physiological sensor identifier, a patient monitoring device identifier, a patient identifier, a patient room identifier, or a speaker identifier. The sound localization controller can also be part of one or more of the patient monitors.

In addition or alternatively, the sound localization controller can be in communication with a single device. For example, the sound localization controller can communicate with a centralized database that includes real-time patient information, such as real time physiological parameter data or real time alarm data.

At block 604, the sound localization controller can determine an origination location of a patient indicator. As described in more detail herein, the localized sound projection system can implement sound localization techniques to exploit a listener's spatial-hearing "map." By coordinating or offsetting speakers, the sound localization controller can simulate the placement of an auditory cue in a three dimensional (3D) space. In other words, the sound localization controller can fool a listener's brain into thinking a sound originates from a particular location. The sound localization controller determines the desired location at which the controller will cause the sound to originate.

The origination location can be a particular location. For example, the origination location can include a general or specific location of a physiological sensor, a patient monitoring device, a patient, a patient's room, a speaker, etc.

In some cases, the origination location can correspond to an ailing body part or a portion of the patient's body that is associated with the patient indicator. As a non-limiting example, if the activation of the patient indicator corresponds to a patient's heartbeat, the origination location can be the location of the patient's chest. Accordingly, the audible noise can sound as though it is coming from the direction of patient's heart. By localizing the sound to a particular portion of the patient's body, a caregiver is quickly informed of the location on the patient which is experiencing an issue and the caregiver can more easily and more efficiently determine what is wrong with the patient.

Furthermore, in some cases, the audible noise can correspond to the physiological parameter associated with the activation of the patient indicator. For example, if the activation of the patient indicator corresponds to a patient's heartbeat, the audible noise can sound like a beating heart. In some cases, the sound will be the patient's heartbeat, rather than an arbitrary heartbeat.

The sound localization controller can determine the target origination location using various techniques. For example, in some cases, the sound localization controller can access a database (for example, a lookup table) which correlates the activations of the patient indicators with origination locations. In addition or alternatively, the sound localization controller can receive the origination location from a patient monitor, such as along with the indication the patient indicator.

The target origination location can correspond to a location of a speaker. For example, the target origination location can correspond to the location of the speaker that is closest to the source of the patient indicator (for example, the patient, the sensor, the patient's room, the physiological monitor, etc.). Accordingly, the sound localization controller can determine a location of one or more of the plurality of speakers and can also determine a location of the source of the patient indicator. The sound localization controller can then select as the origination location the location of the speaker closest to the source of the patient indicator.

At block 606, based at least in part on the origination location and/or a location of one or more of the speakers, the sound localization controller can identify one or more sound parameters. As described herein, each of the speakers can be configured to output auditory signals. In some cases, each of the speakers output an identical audible noise, save one or more sound parameters. The sound parameters can include, but are not limited to, a timing, intensity, or frequency of the audible noise.

In other words, at block 606, the sound localization controller determines how to adjust or modify the sound signals output by the speaker to provide the desired localized projection. In some cases, the sound parameters are based at least in part on the origination location and/or the location of one or more speakers. For example, first speakers that are further from the origination location than second speakers can have sound parameters that include a time delay (for example, 1, 2, 3, 4, 5, 10, milliseconds (+/−a few milliseconds)). Accordingly, sound from first speakers can be time-delayed from the sound of the second speakers).

At block 608, the sound localization controller determines the signals which it will cause the speakers to output. For example, as described here, each of the speakers may be configured to output an identical audible noise, save the one or more sound parameters determined at block 606.

At block 610, the sound localization controller controls the speakers to output the plurality of audible noises that have been adjusted based on the sound parameters.

Figure 7:
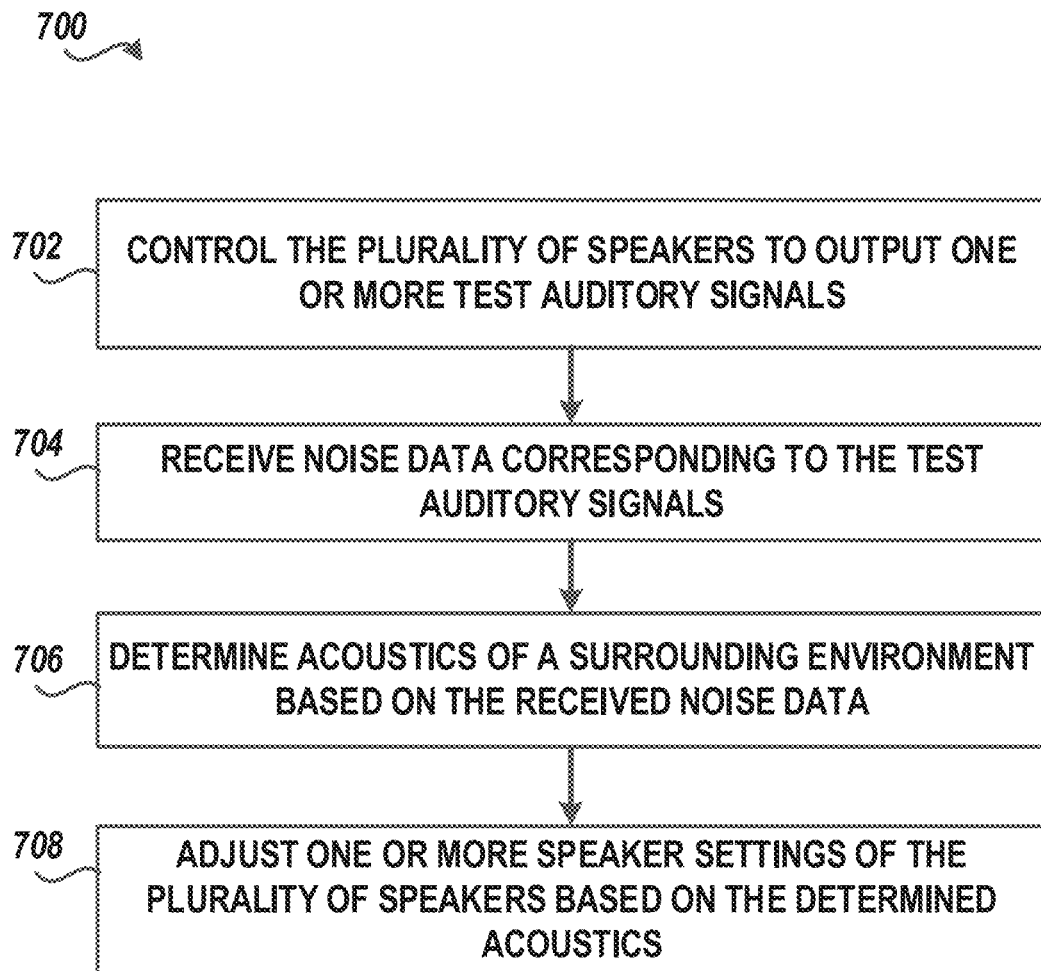
FIG. 7 is a flow diagram illustrative of an embodiment of a routine implemented by a system to adjust speaker settings based on surrounding acoustics.

FIG. 7 is a flow diagram illustrative of an embodiment of a routine implemented by a system to adjust speaker settings based on surrounding acoustics. One skilled in the relevant art will appreciate that the elements outlined for routine 700 can be implemented by an acoustic controller in communication with a plurality of speakers and a noise sensor. In addition or alternatively, routine 700 can be implemented by the patient monitoring device 200 or another computing device in communication with or incorporating the plurality of speakers. Accordingly, routine 700 has been logically associated as being generally performed by patient monitoring device 200. However, the following illustrative embodiment should not be construed as limiting. Furthermore, it will be understood that the various blocks described herein with reference to FIG. 7 can be implemented in a variety of orders. For example, the patient monitoring device 200 can implement some blocks concurrently or change the order as desired. Furthermore, it will be understood that fewer, more, or different blocks can be used as part of the routine 700.

At block 702, the patient monitoring system controls a plurality of speakers to output one or more tests auditory signals. The speakers can be integrated within a housing of the patient monitoring device 200. In some cases, the patient monitor 200 includes two integrated speakers. However, in other cases, the system can include fewer or more speakers. For example, the system can include 1, 3, 4, 5, 6, 7, 8 or more speakers. Each of the speakers can have configurable settings which can be adjusted based off determined acoustics.

At block 704, the patient monitoring system receives noise data corresponding to the test auditory signals. For example, the patient monitoring system can include a noise sensor. The noise sensor can include any of various types of sensors configured to measure noise. For example, the noise sensor can include, but is not limited to, a decibel reader, a microphone, or any other sensor capable of ambient noise detection. The noise sensor can sense the test signals after they are transmitted by the speakers into the environment, and can provide noise sensor data to the patient monitor.

At block 706, the patient monitor can determine acoustics of the surrounding environment based at least on the received noise data from the noise sensor. For example, based on a change in the auditory test signal transmitted by the speakers to the signal received by the noise sensor, the processor can determine one or more properties or qualities of the environment that determine how sound is transmitted in it.

At block 708, based on these properties or qualities of the environment that correspond to the acoustics, the patient monitor can adjust or monitor one or more speaker parameters of the speaker. In some cases, the adjustment can optimize speakers for the determined acoustic environment.

Adjust Volume

Reducing hospital noise and creating a quieter environment for patients can increase both patient satisfaction and patient outcomes. Some hospitals have implemented quiet zones (sometimes known as quiet rooms) where patients and their families can go to relax, on what may be some of the most difficult days of their lives. Similarly, regardless of whether a quiet area exists, certain times of the day, such as nighttime, are preferably quieter. For example, patients may be trying to sleep at this time. Though noise is not responsible for all sleep disruptions, its contribution is significant. In addition, researchers have found the sick and the elderly are the most likely to have their sleep disturbed by noise, and people never completely habituate themselves to nighttime noise. In contrast, many times throughout a hospital day can be hectic and loud. Thus, during these times, quiet audible noises might not be attended to or even heard.

Accordingly, it is an object of the present disclosure to provide a physiological monitoring system that adjusts a speaker volume responsive to changes in environmental noise and/or changes in the time of day. For example, based on an ambient noise level or a time of day, the physiological monitoring system can determine that a quieter audible noise is preferred and can lower a volume of a speaker. In contrast, based on an ambient noise level or a time of day, the physiological monitoring system can determine that a louder audible noise is preferred and can raise a volume of a speaker.

Figure 8:
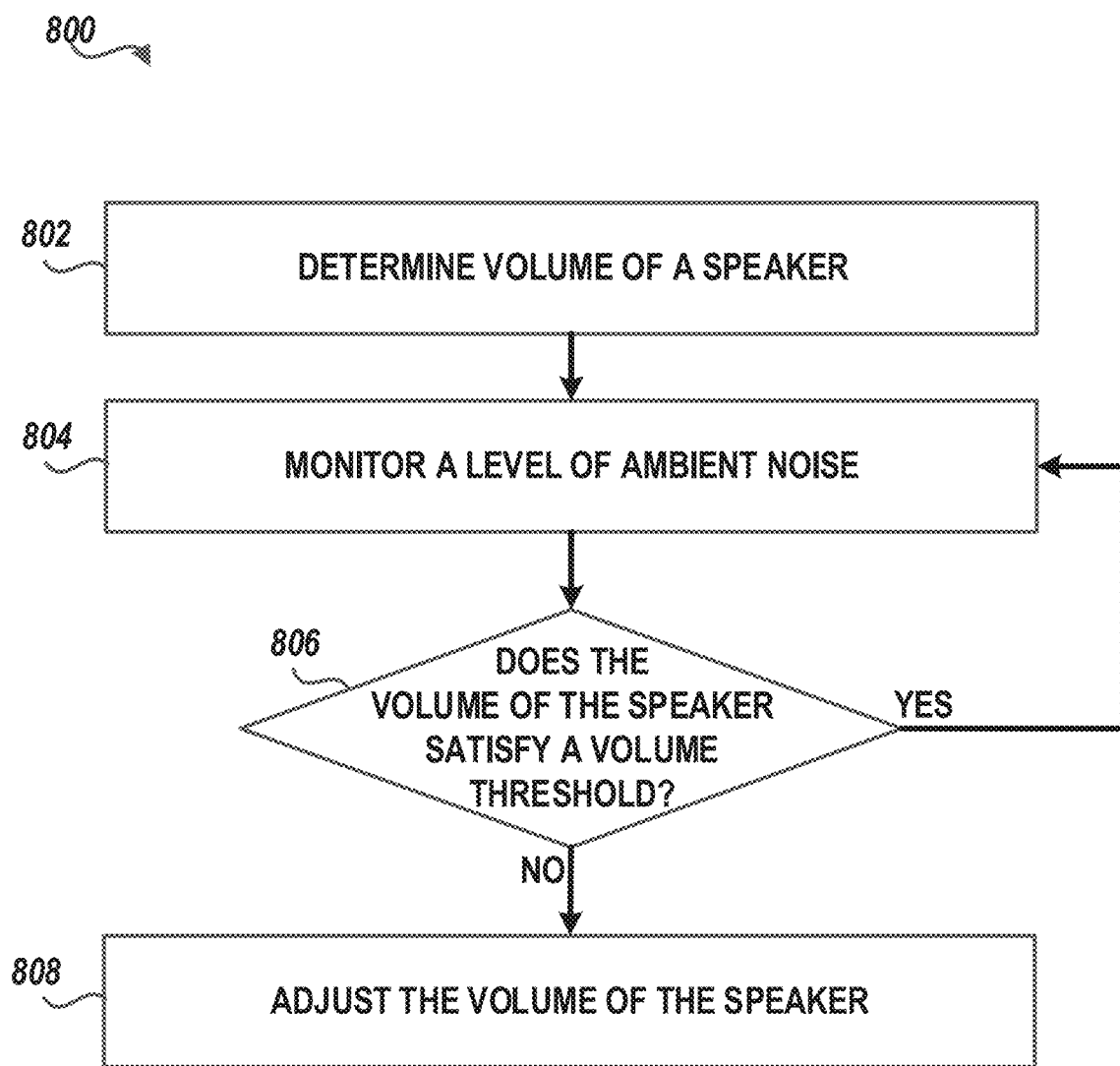
FIG. 8 illustrates a flow diagram of an example routine for adjusting volume of a speaker.

FIG. 8 is a flow diagram illustrative of an example of a routine for adjusting volume of a speaker. It will be understood that the various blocks described herein with reference to FIG. 8 can be implemented in a variety of orders. For example, the patient monitoring system can implement some blocks concurrently or change the order, as desired. Furthermore, it will be understood that fewer, more, or different blocks can be used as part of the routine 800.

At block 802, a patient monitoring system can determine a volume of a speaker. The speaker can be an internal speaker similar to the speaker illustrated in FIG. 3, or an external speaker similar to the speaker 400 illustrated in FIG. 4. In some cases, the volume level of the speaker is a parameter known by the patient monitoring system, while in other cases the patient monitoring system can measure the volume of the speaker using a decibel reader, a microphone, or any other sensor capable of noise detection.

At block 804, the patient monitoring system monitors and determines a level of ambient noise. For example, the system can utilize an ambient noise sensor such as a decibel reader, a microphone, or any other sensor capable of ambient noise detection. Ambient noise can include, but is not limited to, noise in the surrounding environment (such as within a certain distance from the patient monitor), noise in the patient's room, noise on the corresponding hospital floor, noise outside the hospital, etc.

The determination of the level of ambient noise can include a determination of an ambient noise decibel level. For example, if the speaker is providing an audible noise while the patient monitor is monitoring the ambient noise, the detected level of ambient noise may be higher than the actual ambient noise. Accordingly, the ambient noise sensor can compensate for the sound of the speaker such that the patient monitor can determine an accurate level of ambient noise.

The patient monitoring system can continuously or periodically monitor the level of ambient noise. For instance, the ambient noise level can be monitored every 30 seconds, 1 minutes, 5 minutes, 30 minutes, 1 hour, etc.

At block 806, the patient monitoring system can determine a threshold volume. In some cases, the threshold volume may be based at least in part on the ambient noise level measured at block 804. For example, the threshold volume can be matched to the ambient noise level. Accordingly, based at least in part on a determination that the ambient noise level corresponds to a quiet zone, the patient monitoring system can determine that the threshold volume corresponds to the volume of the quiet zone. Similarly, based at least in part on a determination that the ambient noise level corresponds to a louder area, the patient monitoring system can determine that the threshold volume corresponds to the louder volume.

In addition or alternatively, the patient monitoring system can determine the threshold volume based at least in part on the time of day. For example, the patient monitoring system can determine the time of day and can determine the threshold volume based at least in part on the time of day. For example, a correlation between the time of day and the threshold volume can be in a database that the patient monitoring system can access. As a non-limiting example, the patient monitoring system can determine that the time of day corresponds to nighttime. Accordingly, the patient monitoring system can determine that the threshold volume corresponds to a quiet zone. In contrast, the patient monitoring system can determine that the time of day corresponds to daytime. Accordingly, the patient monitoring system can determine that the threshold volume corresponds to a normal or average volume.

Continuing with block 806, the patient monitoring system can determine whether the volume of the speaker satisfies the threshold volume. In some cases, the volume of the speaker does not satisfy the threshold volume unless the volume of the speaker matches the threshold volume. Accordingly, if the volume of the speaker does not match the threshold volume than the process continues to block 708, where it can adjust the volume of the speaker. However, and other cases, the volume of the speaker satisfies the threshold volume if the volume of the speaker is within a distance threshold of the threshold volume. The distance threshold can vary across embodiments. For example, the distance threshold can correspond to a particular difference in decibel level between the threshold volume. For example, the distance threshold can correspond to 1 dB, 2 dB, 5 dB, 10 dB, 20 db, or 25 dB.

If the processor determines that the volume of the speaker satisfies the volume threshold, or is within a distance threshold of the volume threshold, then the volume of the speaker is not adjusted. The processor can return to block 804 to continue monitoring the ambient noise level.

At block 808, the processor determines that the volume of the speaker does not satisfy the volume threshold. In other words, the processor determines that the volume of the speaker is not within a distance threshold of the volume threshold. Accordingly, the processor adjusts the volume of the speaker. For example, if the volume of the speaker is above the volume threshold then the volume of the speaker can be reduced. In some cases, the volume of the speaker is reduced by a predetermined amount, for instance, 5, 10, 15, 20, or 25 dB. Reducing the volume of the speaker by a predetermined amount can be advantageous because the threshold volume can sometimes be drastically different from the volume of the speaker. Accordingly, it may be preferred to gradually change the speaker volume rather than change is dramatically. Alternatively, the processor can adjust the volume of the speaker to match the threshold volume. Similarly, the processor can adjust the volume of the speaker to fit within the distance threshold of the threshold volume.

As another example, if the volume of the speaker is below the volume threshold then the volume of the speaker can be increased. In some cases, the volume of the speaker is increased by a predetermined amount, for instance, 5, 10, 15, 20, or 25 dB. Increasing the volume of the speaker by a predetermined amount can be advantageous because the threshold volume can sometimes be drastically different from the volume of the speaker. Accordingly, it may be preferred to gradually change the speaker volume rather than change is dramatically. Alternatively, the processor can adjust the volume of the speaker to match the threshold volume. Similarly, the processor can adjust the volume of the speaker to fit within the distance threshold of the threshold volume.

As a non-limiting example, if the ambient noise sensor detects an ambient noise level indicative of a quiet zone, the physiological monitoring system can reduce the volume of the speaker if the speaker is above 60 dB. For instance, if the speaker is above 60 dB, the volume can be gradually reduced by a few dB until the actual speaker volume satisfies the volume threshold.

The physiological monitoring system can turn off (or mute) some or all audible noises in response to determining that quiet zone exists (for example, based on detected environmental noise, time of day, etc.). For example, the physiological monitoring system can mute alarms which are not critical to patient health or those that do not require immediate action. In some cases, the patient monitoring system alters the volume of non-critical parameters, but does not alter the volume of critical parameters. Alternatively or in addition, in response to determining that quiet is preferred the physiological monitoring system can cause a new visual patient indicator to display or can cause a visual indicator to display more brightly or noticeably. Similarly, in response to a determination that a quiet zone does not exist, some or all audible noises can be turned on or unmuted. For example, even alarms which are not critical to patient health or do not require immediate action may be activated or turned on.

As another non-limiting example, based on a determination that a time of day or ambient noise level indicates a quiet zone, the physiological monitoring system can reduce the volume of the speaker to conform with the requirements of the quiet zone. However, if a sudden commotion occurs that increases the ambient noise, the system can re-asses the volume of the speaker. For example, a crashing patient in need of assistance can significantly increase the ambient noise levels. Accordingly, based on a determination that the ambient noise level has increased, the system can increase the volume of the speaker to ensure the speaker's audible signals can be heard. When the emergency subsides and the quiet zone quietens again, the system can determine the ambient noise levels indicate a quiet zone, and can reduce the volume of the speaker.

Adjust Display Settings

In some instances, a display associated with a patient monitor or other medical device can be difficult to see or cause eyestrain because the ambient light surrounding the display is too intense. Accordingly, it can be advantageous to adjust the display settings of the display in response to the surround ambient light. For example, the human eye perceives different colors under different levels of illumination (sometimes referred to as the Purkinje effect). Accordingly, the physiological monitoring system can adjust the tint of the display to assist a user in perceiving the correct color. As such, it is an object of the present disclosure to adjust a display based on the ambient light, by dimming the display to lessen eyestrain, diminish annoying bright lights, and/or provide better picture quality. In addition or alternatively, it is an object of the present disclosure to adjust a display based on the ambient light by brightening the disclosure to increase visibility.

Figure 9:
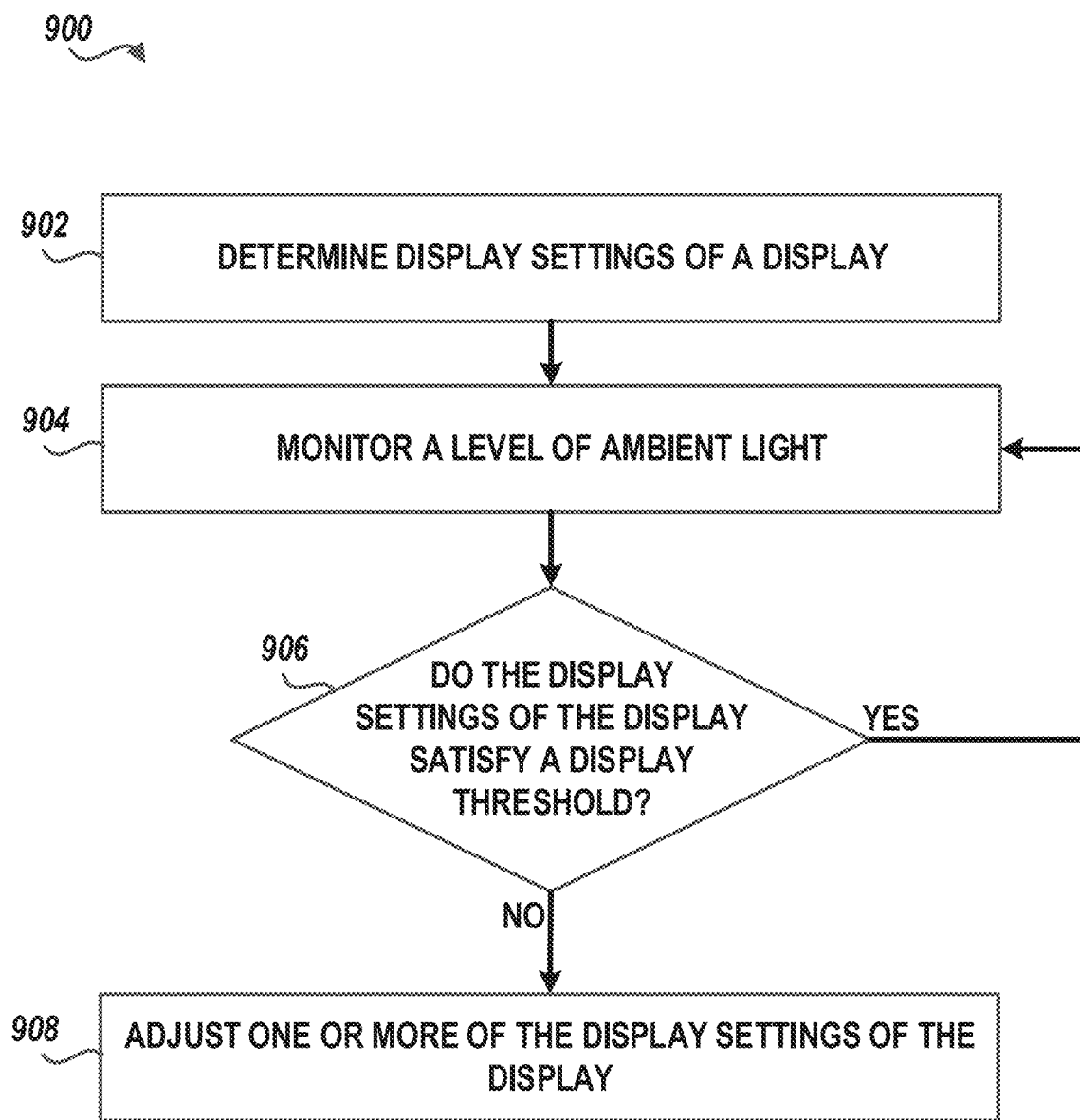
FIG. 9 is a flow diagram illustrative of an example routine for adjusting display settings of a display.

FIG. 9 is a flow diagram illustrative of an example of a routine for adjusting display settings of a display. It will be understood that the various blocks described herein with reference to FIG. 9 can be implemented in a variety of orders. For example, the patient monitoring system can implement some blocks concurrently or change the order, as desired. Furthermore, it will be understood that fewer, more, or different blocks can be used as part of the routine 900.

At block 902, a patient monitoring system can determine display settings of a display. For instance, the display settings can include, but are not limited to, brightness, tint, contrast, color, color saturation, color temperature, sharpness, and/or backlight. Brightness can indicate how dark the dark areas of the image are, and backlight can indicate how bright the image is. In some cases, the display settings are parameters known by the patient monitoring system.

At block 904, the patient monitoring system can monitor and determine an intensity of ambient light. For example, the patient monitor can utilize an ambient light sensor to determine the intensity of ambient light. In some cases, the intensity of ambient light can include the intensity of light in the surrounding environment. The patient monitoring system can continuously or periodically monitor the intensity of ambient light. For instance, the ambient light can be monitored every 30 seconds, 1 minutes, 5 minutes, 30 minutes, 1 hour, etc.

At block 906, the patient monitoring system can determine a display threshold. In some cases, the display threshold may be based at least in part on the ambient light level measured at block 904. For example, the display threshold can be matched to the ambient light level. Accordingly, based at least in part on a determination that the ambient light level corresponds to a dark environment, the patient monitoring system can determine that the display threshold corresponds to the a dark environment. For a bright environment, it may be advantageous to have a dull or less bright display. Similarly, based at least in part on a determination that the ambient light level corresponds to a bright environment, the patient monitoring system can determine that the threshold volume corresponds to a bright environment. For a bright environment, it may be advantageous to have a bright display.

In addition or alternatively, the patient monitoring system can determine the display threshold based at least in part on the time of day. For example, the patient monitoring system can determine the time of day and can determine the display threshold based at least in part on the time of day. For example, a correlation between the time of day and the threshold volume can be in a database that the patient monitoring system can access. As a non-limiting example, the patient monitoring system can determine that the time of day corresponds to nighttime. Accordingly, the patient monitoring system can determine that the threshold volume corresponds to a dark environment. In contrast, the patient monitoring system can determine that the time of day corresponds to daytime. Accordingly, the patient monitoring system can determine that the display threshold corresponds to a bright environment.

Continuing with block 906, the patient monitoring system can determine whether the display settings satisfy the display threshold. In some cases, the display settings of the display do not satisfy the display threshold unless the display settings of the display match the display threshold. Accordingly, if the display settings of the display do not match the display threshold, then the process can continue to block 908, where it can adjust the display settings of the display. However, in other cases, the display settings of the display satisfy the display threshold if the display settings of the threshold or within a distance threshold of the display threshold. The distance threshold can vary across embodiments. For example, distance threshold can include 1, 2, 5, 10, 20, or 25 arbitrary display units.

At block 908, the processor determines that the display parameters of the display do not satisfy the display threshold. In other words, the processor determines that the volume of the speaker is not within a distance threshold of the volume threshold. Accordingly, the processor adjusts the display parameters of the display for example, by brightening the display or reducing a brightness of the display.

As a non-limiting example, if the ambient light sensor detects a low level of light (for example, a dim room) and detects the display is set at a high tint level, the physiological monitoring system can determine a tint of the display does not satisfy a tint threshold. Accordingly, the processor can adjust the display by increasing or decreasing the tint. Similarly, the physiological monitoring system can adjust the display settings of a display in response to the ambient light sensor detecting a high level of light (for example, a bright room). For instance, if the ambient light sensor detects a high level of light and a dull display, the physiological monitoring system can adjust the display by increasing the brightness, increasing the contrast, and/or tinting the screen color.

In addition or alternatively, the physiological monitoring system can adjust the display settings of the display based on the time of day. For instance, the display can be set to a high brightness mode during the day and a low brightness mode later into the evening. The display can cycle between these modes automatically or can be cycled manually by a user.

Voice Control

Figure 10:
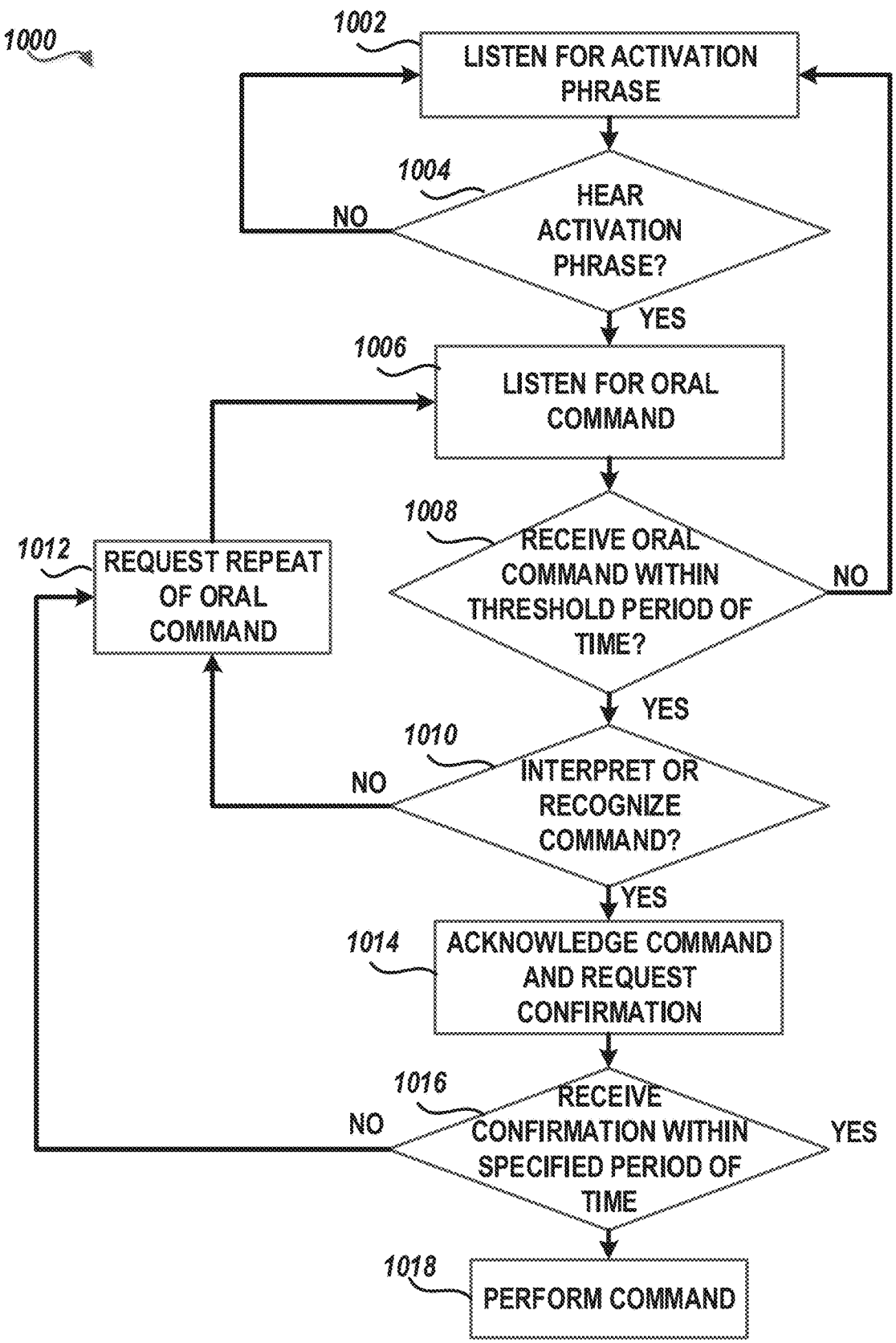
FIG. 10 is a flow diagram illustrative of an example routine for audibly altering parameters of a medical device.

FIG. 10 is a flow diagram illustrative of an example of a routine 1000 for audibly altering parameters of a medical device. It will be understood that the various blocks described herein with reference to FIG. 10 can be implemented in a variety of orders. For example, the patient monitoring system can implement some blocks concurrently or change the order, as desired. Furthermore, it will be understood that fewer, more, or different blocks can be used as part of the routine 1000.

At block 1002, the medical device listens for an activation phrase. For example, the device can utilize a speaker/microphone combination which is constantly listening for the activation phrases (sometimes referred to as a wake-up phase or wake-up word). In some cases, the activation phrase can be, for example, "Hey Patient Monitor."

At block 1004, the device determines that an activation phrase has been recited. The system can acknowledge that it has heard the activation phrases. For example, it may give a verbal acknowledgement or a visual indicator.

At block 1006, the device listens for an oral command. The system can include a database of oral commands of which it can be requested. For instance, a user may be able to change a parameter, an alarm setting, a medical level, or otherwise manipulate a medical device through voice control. In some cases, the system can understand oral commands even if they do not exactly match what is in the database of command. Accordingly, many commands work when worded several different ways or even with words omitted.

At block 1008, the device determines whether it received an oral command within a specified time period. In some cases, a user may "wake-up" the medical device accidentally or may forget how they want to manipulate the device. Accordingly, if a specified time period expires without the device receiving an oral command, the device advantageously returns to a sleep state and listens for another activation phrase (step 1002). The time period can be, for example, about 1, 2, 3, 4, or 5 seconds.

At block 1010, the device determines that it did receive an oral command, or at the least, the device heard some audible noise. Accordingly, the device determines whether it recognized command, for instance, by comparing the command to a library of commands. As mentioned above, many commands may be accepted, despite being worded differently or even leaving out words.

At block 1012, the device determines that it did not recognize the command and it requests a user to repeat the command. Then it returns to block 1006 to listen for another oral command. In some cases, if the device does not recognize the command, it will predict or suggest a command based on the received oral command. In addition or alternatively, the device can revert back to block 1002, where it will listen for an activation phrase.

At block 1014, the device determined that it did recognize the oral command. The device then acknowledges the command and requests a confirmation that the acknowledged command is accurate.

The device can acknowledge the command by repeating it aloud via a speaker. In addition or alternatively, the device can acknowledge the command by displaying the command on a display. In addition or alternatively, the device may not acknowledge the command.

The device then requests a confirmation from the user of the acknowledged command. For instance, the device can ask the user a question and the user can respond affirmatively. For instance, the device may ask the user, "Change pressure settings to 20 PSI?" If the user agrees, the user can respond verbally (for example, "Yes") or respond by selecting an input of the device. The confirmation request can be presented on a display for someone to accept. This advantageously allows the user to read exactly what command the device will perform respond accordingly.

At block 1016, the device determines whether it received a confirmation within a specified period of time. If it does not (or if the user responds negatively to the confirmation request) then the device can ask the user to repeat the command (block 1012), listen for activation phrase (block 1002) or send another request for confirmation (block 1014). The time period can be, for example, about 1, 2, 3, 4, or 5 seconds.

At block 1018, the device has determined which command the user desires it to perform and has received a confirmation from the user of that command. Accordingly, the device performs the action associated with the command.

Terminology

The term "and/or" herein has its broadest least limiting meaning which is the disclosure includes A alone, B alone, both A and B together, or A or B alternatively, but does not require both A and B or require one of A or one of B. As used herein, the phrase "at least one of" A, B, "and" C should be construed to mean a logical A or B or C, using a non-exclusive logical or.

The term "plethysmograph" includes it ordinary broad meaning known in the art which includes data responsive to changes in volume within an organ or whole body (usually resulting from fluctuations in the amount of blood or air it contains).

The following description is merely illustrative in nature and is in no way intended to limit the disclosure, its application, or uses. For purposes of clarity, the same reference numbers will be used in the drawings to identify similar elements. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage. Although the foregoing invention has been described in terms of certain preferred embodiments, other embodiments will be apparent to those of ordinary skill in the art from the disclosure herein. Additionally, other combinations, omissions, substitutions and modifications will be apparent to the skilled artisan in view of the disclosure herein. Accordingly, the present invention is not intended to be limited by the reaction of the preferred embodiments, but is to be defined by reference to claims.

Additionally, all publications, patents, and patent applications mentioned in this specification are herein incorporated by reference to the same extent as if each individual publication, patent, or patent application was specifically and individually indicated to be incorporated by reference.

What is claimed is:

1. A method for controlling one or more speakers, the method comprising:
    under control of a hardware processor in a housing:
        monitoring a level of ambient noise in an environment of a person using a sensor in the housing;
        determining a threshold volume for output of an audible alert based at least in part on the monitored level of ambient noise;
        monitoring a health status of the person based on at least one physiological sensor configured to measure one or more physiological parameters from a tissue of the person, the physiological sensor connected to the housing and wherein the hardware processor receives and processes physiological information from the physiological sensor to determine the physiological parameters;
        determining a first adverse health event based on the monitored health status; and
        based at least in part on the determined adverse health event, dynamically controlling output of the one or more speakers in the housing, and wherein said dynamically controlling comprises, for each of the one or more speakers:
            determining a first audible alert to output by the one or more speakers based at least in part on the first adverse health event,
            identifying a first priority of the first audible alert, and
            based at least in part on the first priority of the first health event, causing the one or more speakers to:
                reduce a volume of a current output of the one or more speakers, the current output comprising at least a second audible alert, and
                output the first audible alert on the one or more speakers at the determined threshold volume.

2. The method of claim 1, wherein said dynamically controlling further comprises determining a second priority of the second audible alert and determining that the second priority is less than the first priority.

3. The method of claim 1, wherein the first priority comprises a criticality of the first adverse health event.

4. The method of claim 1, wherein the first adverse health event corresponds to an abnormal heartbeat of the person.

5. The method of claim 1, further comprising in response to reducing the volume of the current output of the one or more speakers, causing a visual patient indicator associated with the second audible alert to display on a patient monitoring device.

6. The method of claim 1, wherein the second audible alert is associated with a non-critical status of the person or at least one physiological sensor.

7. A system for controlling one or more speakers, the system comprising:
    one or more physiological sensors;
    one or more speakers in a housing; and
    a controller in the housing in communication with the one or more physiological sensors and the one or more speakers in the housing, the controller configured to:
        monitor a level of ambient noise in an environment of a person;
        determine a threshold volume for output of an audible alert based at least in part on the monitored level of ambient noise;
        monitor a health status of the person based on at least one physiological sensor configured to measure one or more physiological parameters from tissue of the person, the physiological sensor connected to the housing and wherein the hardware controller receives and processes physiological information from the physiological sensor to determine the physiological parameters;

determine a first adverse health event based on the monitored health status; and based at least in part on the determined adverse health event, dynamically control output of the one or more speakers, and wherein to dynamically control, the controller is configured to:

determine a first audible alert to output by the one or more speakers based at least in part on the first adverse health event, identify a first priority of the first audible alert, and based at least in part on the first priority of the first health event, cause the one or more speakers to:

reduce a volume of a current output of the one or more speakers, the current output comprising at least a second audible alert, and output the first audible alert on the one or more speakers at the determined threshold volume.

8. The system of claim 7, wherein the controller dynamically controls the output of one or more speakers at least by determining a second priority of the second audible alert and determining that the second priority is less than the first priority.

9. The system of claim 7, wherein the first priority comprises a criticality of the first adverse health event.

10. The system of claim 7, wherein the first adverse health event corresponds to an abnormal heartbeat of the person.

11. The system of claim 7, wherein the controller is further configured to, in response to reducing the volume of the current output of the one or more speakers, cause a visual patient indicator associated with the second audible alert to display on a patient monitoring device.

12. The system of claim 7, wherein the second audible alert is associated with a non-critical status of the person or at least one physiological sensor.

* * * * *